(12) United States Patent
Kulkarni et al.

(10) Patent No.: US 12,248,111 B2
(45) Date of Patent: Mar. 11, 2025

(54) WELL LOG CORRELATION SYSTEM

(71) Applicant: Schlumberger Technology Corporation, Sugar Land, TX (US)

(72) Inventors: Mandar Shrikant Kulkarni, Yerawada (IN); Purnaprajna Raghavendra Mangsuli, Pune (IN); Aria Abubakar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/697,973

(22) PCT Filed: Nov. 1, 2022

(86) PCT No.: PCT/US2022/048503
§ 371 (c)(1),
(2) Date: Apr. 2, 2024

(87) PCT Pub. No.: WO2023/081113
PCT Pub. Date: May 11, 2023

(65) Prior Publication Data
US 2024/0411041 A1  Dec. 12, 2024

(30) Foreign Application Priority Data
Nov. 2, 2021  (IN) .............................. 202121050390

(51) Int. Cl.
*G01V 1/46* (2006.01)
*E21B 47/12* (2012.01)
(Continued)

(52) U.S. Cl.
CPC ................ *G01V 1/366* (2013.01); *G01V 1/34* (2013.01); *G01V 1/46* (2013.01); *G01V 3/32* (2013.01); *E21B 47/12* (2013.01); *E21B 2200/22* (2020.05)

(58) Field of Classification Search
CPC ....... E21B 47/12; E21B 2200/22; G01V 1/46; G01V 3/32
See application file for complete search history.

(56) References Cited

U.S. PATENT DOCUMENTS

2007/0145259 A1* 6/2007 Gilchrist ................ G01V 5/125
250/269.1
2015/0316685 A1 11/2015 Dimitrov
(Continued)

FOREIGN PATENT DOCUMENTS

CN      115982338 B   *  6/2023
WO   WO-2022122121 A1  *  6/2022  ............. G10L 15/02

OTHER PUBLICATIONS

Zha, Bing, and et al. "Deep transformer networks for time series classification: the npp safety case." arXiv preprint arXiv: 2104. 05448 (2021) (Year: 2021).*

(Continued)

*Primary Examiner* — Douglas Kay
(74) *Attorney, Agent, or Firm* — Jeffrey D. Frantz

(57) ABSTRACT

A method can include receiving well logs, as series data, for wells, where the well logs represent stratigraphic characteristics of a field; for each of the well logs, generating a corresponding vector representation in a dimensional space using a transformer encoder; and determining similarity of the well logs via their corresponding vector representations to characterize well log quality for well log correlation of the field.

12 Claims, 16 Drawing Sheets

(51) Int. Cl.
*G01V 1/34* (2006.01)
*G01V 1/36* (2006.01)
*G01V 3/32* (2006.01)

(56) References Cited

U.S. PATENT DOCUMENTS

| | | |
|---|---|---|
| 2016/0124116 A1 | 5/2016 | Souche |
| 2017/0329031 A1* | 11/2017 | Collins .................... G01V 1/50 |
| 2018/0321421 A1* | 11/2018 | Halabe ................... G01V 11/00 |
| 2020/0183044 A1* | 6/2020 | Doronichev ............. G01V 5/12 |
| 2020/0225383 A1 | 7/2020 | Mallet |
| 2021/0089892 A1* | 3/2021 | Kulkarni ........... G06F 16/90335 |
| 2021/0301647 A1* | 9/2021 | Benson ................... E21B 47/04 |
| 2021/0303965 A1 | 9/2021 | Yin |

OTHER PUBLICATIONS

Akkurt, Ridvan, and et al. "Accelerating and enhancing petrophysical analysis with machine learning: a case study of an automated system for well log outlier detection and reconstruction." In SPWLA Annual Logging Symposium, p. D043S008R004. SPWLA, 2018 (Year: 2018).*

Search Report and Written Opinion of International Patent Application No. PCT/US2022/048503; Dated Mar. 2, 2023; 8 pages.

* cited by examiner

WELL LOG CORRELATION SYSTEM

CROSS-REFERENCE TO RELATED APPLICATIONS

This application is a National Stage Entry of International Application No. PCT/US2022/048503, filed Nov. 1, 2022, which claims the benefit of Indian Patent Application number 202121050390 entitled "Well Log Correlation System," filed Nov. 2, 2021, the disclosure of which is incorporated by reference in its entirety.

BACKGROUND

Interpretation is a process that involves analysis of data to identify and locate various subsurface structures (e.g., horizons, faults, geobodies, etc.) in a geologic environment. Various types of structures (e.g., stratigraphic formations) may be indicative of hydrocarbon traps or flow channels, as may be associated with one or more reservoirs (e.g., fluid reservoirs). In the field of resource extraction, enhancements to interpretation can allow for construction of a more accurate model of a subsurface region, which, in turn, may improve characterization of the subsurface region for purposes of resource extraction. Characterization of one or more subsurface regions in a geologic environment can guide, for example, performance of one or more operations (e.g., field operations, etc.).

SUMMARY

A method can include receiving well logs, as series data, for wells, where the well logs represent stratigraphic characteristics of a field; for each of the well logs, generating a corresponding vector representation in a dimensional space using a transformer encoder; and determining similarity of the well logs via their corresponding vector representations to characterize well log quality for well log correlation of the field. A system can include a processor; memory operatively coupled to the processor; and processor-executable instructions stored in the memory to instruct the system to: receive well logs, as series data, for wells, where the well logs represent stratigraphic characteristics of a field; for each of the well logs, generate a corresponding vector representation in a dimensional space using a transformer encoder; and determine similarity of the well logs via their corresponding vector representations to characterize well log quality for well log correlation of the field. One or more computer-readable storage media can include computer-executable instructions executable to instruct a computing system to: receive well logs, as series data, for wells, where the well logs represent stratigraphic characteristics of a field; for each of the well logs, generate a corresponding vector representation in a dimensional space using a transformer encoder; and determine similarity of the well logs via their corresponding vector representations to characterize well log quality for well log correlation of the field. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
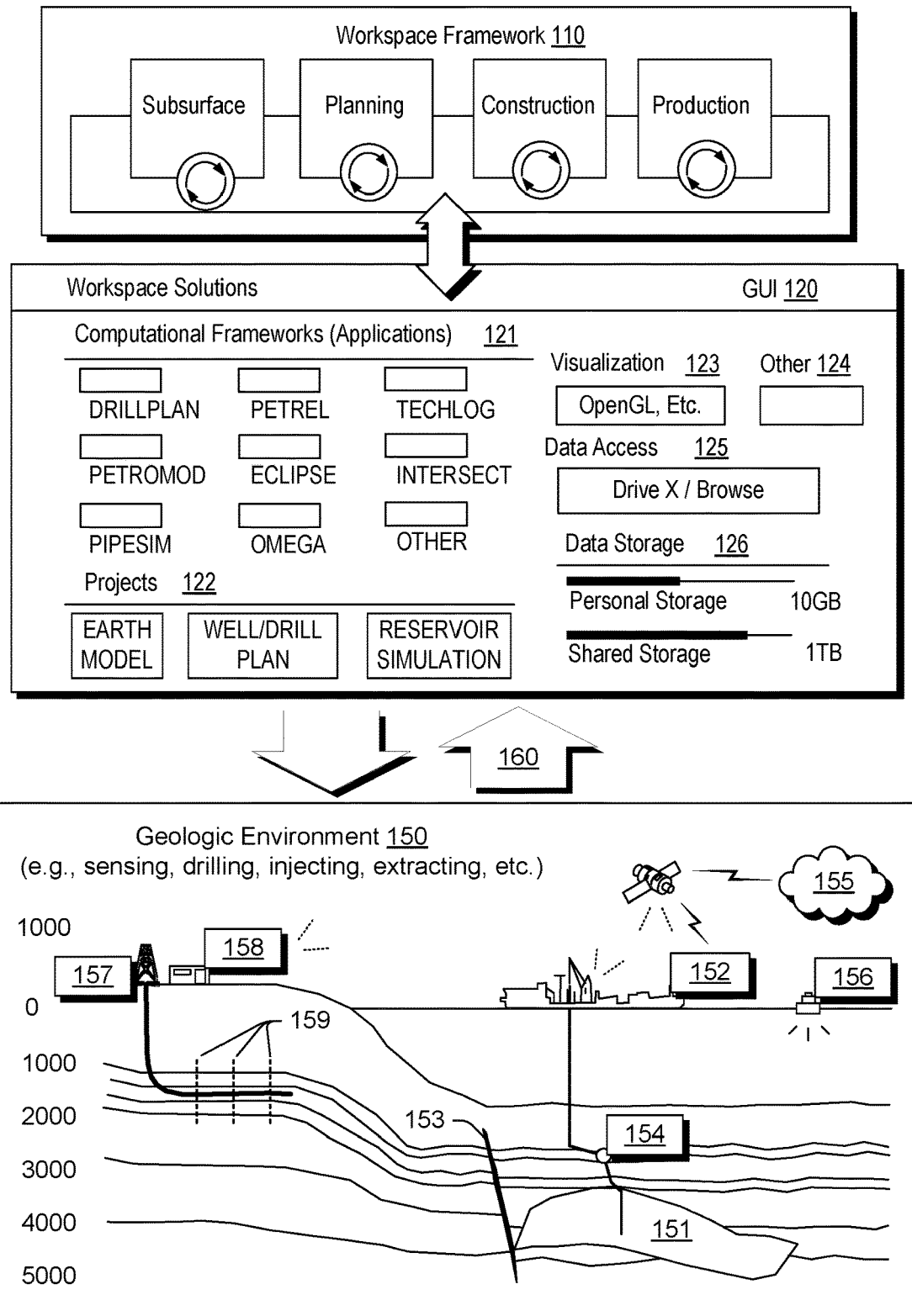
FIG. 1 illustrates an example system that includes various components for modeling a geologic environment and various equipment associated with the geologic environment.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As an example, a system may include a computational environment that can include various features of the DELFI environment (Schlumberger Limited, Houston, Texas), which may be referred to as the DELFI framework, which may be a framework of frameworks. As an example, the DELFI framework can include various other frameworks, which can include, for example, one or more types of models (e.g., simulation models, etc.). Some examples of frameworks can include the DRILLPLAN, PETREL, TECHLOG, PIPESIM, ECLIPSE, INTERSECT, MANGROVE, OMEGA and PETROMOD frameworks (Schlumberger Limited, Houston, Texas).

As an example, a system may include features of a simulation framework that provides components that allow for optimization of exploration and development operations (e.g., "E&P" operations). A framework may include seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. As an example, various components may be implemented as add-ons (or plug-ins) that conform to and operate according to specifications of a framework environment (e.g., according to application programming interface (API) specifications, etc.).

The aforementioned DELFI environment is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework, a measurements framework, a mechanical earth modeling (MEM) framework, an exploration risk, resource, and value assessment framework, a reservoir simulation framework, a surface facilities framework, a stimulation framework, etc. As an example, one or more methods may be implemented at least in part via a framework (e.g., a computational framework) and/or an environment (e.g., a computational environment).

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks that may be part of a DELFI environment.

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can provide for implementing various tasks in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. Such a converter may provide for interoperability, integration of code from one or more sources, etc.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.). As an example, a visualization framework such as the OpenGL framework (Khronos Group, Beaverton, Oregon) may be utilized for visualizations. The OpenGL framework provides a cross-language, cross-platform application programming interface for rendering 2D and 3D vector graphics where the API may be used to interact with a graphics processing unit (or units), to achieve hardware-accelerated rendering.

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment, which is a secure, cognitive, cloud-based collaborative environment that integrates data and workflows with digital technologies, such as artificial intelligence and machine learning. As an example, such an environment can provide for operations that involve one or more frameworks.

As an example, a framework (e.g., TECHLOG, PETREL, etc.) can provide for performing one or more types of well correlation workflows, which can include connection of points from well to well, for example, where data indicate that the points (e.g., locations) are likely to have been deposited at a common chronostratigraphic time and/or possess similar and/or related characteristics. A framework can include well correlation features that can display logs, core images, seismic data, grid data, and completions and simulation results, which may be played through time. As an example, such a framework may be utilized to geosteer horizontal and highly deviated wells with one or more logging while drilling (LWD) tools, optionally in real time. As an example, deviated wells may be displayed overlain on seismic or 3D grid properties.

As an example, the PETREL framework can allow for cross sections that can be interactively created and shared across one or more projects and, for example, be directly edited in a 2D or map window (e.g., via one or more graphical user interfaces). As an example, a GUI tool can provide for picking features (e.g., generating a marker that is a point of interest at a certain depth on a log), estimating logs by trained neural networks, and performing interactive log conditioning that can facilitate robust stratigraphic interpretation. Computational resources can allow the PETREL framework to handle advanced visualization, for example, for thousands of wells simultaneously.

Various features of the PETREL framework provide for interpretation of discrete properties interactively; automatically (or manually) picking and editing well tops on a cross section and visualization of effects directly in 3D and vice versa; editing existing logs and/or generating new ones from a number of curves by using a well log calculator, log editor, or interactive log conditioning toolbar; generating ghost curves for multiple logs simultaneously, for example, with stretch and squeeze tools and automatic drop of markers; displaying logs, core images, point data, image interpretations (e.g., rose diagrams and tadpoles) from the Schlumberger FMI fullbore formation microimager, FMI-HD high-definition formation microimager, QUANTA GEO photorealistic reservoir geology service, checkshots, and synthetic seismograms; interpreting raster logs with high resolution; creating backdrop seismic data, generic surfaces, 3D grid geometry, 3D grid properties with optional transparency, completions, and simulation results with an associated dynamic time player; visualizing and interpreting on deviated wells in a cross section; and geosteering horizontal and/or highly deviated wells, optionally in real time, for example, with multiple measurements and borehole images being rendered to one or more displays (e.g., via one or more GUIs).

As an example, information acquired by a tool (e.g., a borehole tool, a downhole tool, etc.) may be analyzed using a framework such as the TECHLOG framework. The TECHLOG framework includes: core system features; geology features; geomechanics features; geophysics features; petrophysics features; production features; reservoir engineering features; and shale features.

Data-based interpretation may aim to identify and/or classify one or more subsurface boundaries based at least in part on one or more parameters, which can include one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, a method can include inverting, for example, from data to a model, which may be a structural model of a geologic region (e.g., a portion of a basin, etc.). An inversion process can be performed utilizing various types of information, particularly acquired data from one or more sensors where the inversion process aims to generate a model that exhibits at least some consistency with the information. An inversion process can include solving an inverse problem, which may be formulated via various equations and solved using computational resources (e.g., one or more processors, memory, etc.).

A well log can be a record (e.g., a recording) of well log signals and/or signal-based output. A well log can be a record of results of electronic measurements of physical quantities acquired in a continuum fashion (e.g., time series and/or depth series), which may be at one or more different well depths.

As an example, a computational framework can include features that facilitate interpretation of subsurface well logs by automatically and/or semi-automatically correlating points from one log to another. For example, given a log that has been interpreted by a human (e.g., in the sense of having identified different points of interest in the log), a framework may automatically interpret a set of neighboring logs.

As mentioned, well log information may be processed using one or more frameworks (e.g., consider the PETREL framework, the TECHLOG framework, etc.). As mentioned, the PETREL framework may automatically (or manually) provide for picking and editing well tops on a cross section. A field may include relatively flat formations and/or formations that can vary. In various instances, lateral geologic variations can make propagation of points (e.g., picked markers) from one log to another log more difficult. A picked marker may be via manual picking, for example, consider an interpretation process that can include rendering a log to a display and where a user may utilize a human input device (HID) for pickick a feature of the log where picking generates a marker that is a point of interest at a certain depth on the log (e.g., or a range of depths on the log, etc.).

As an example, a computational framework can include features that, given a set of well logs in a field, minimize the number of picks (interpretations) a human (or humans) make manually. Such an approach may reduce the number of picks, at least in part by iteratively and automatically correlating one or more human picked logs to at least a portion of the other logs.

Figure 2:
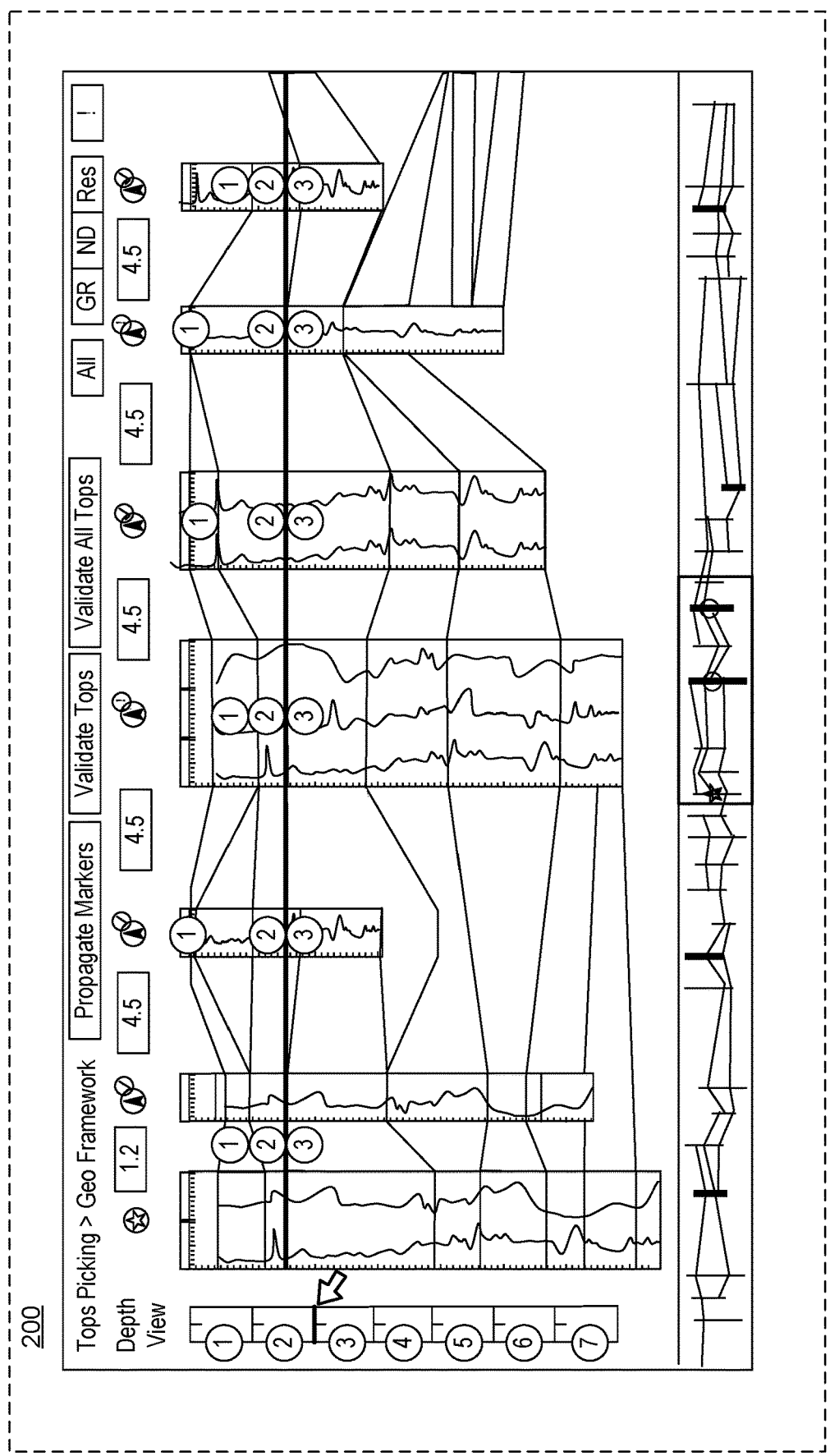
FIG. 2 illustrates an example of a graphical user interface (GUI) of a framework that includes examples of well logs.

FIG. 2 shows an example of a graphical user interface (GUI) 200 of a framework where picking and/or propagation (e.g., well correlation, etc.) workflows may be performed. In the example of FIG. 2, the GUI 200 shows well logs for seven wells in a field that may include many more wells. For example, consider a horizontal graphic near the bottom of the GUI 200 where an adjustable window may be utilized for selecting a number of wells to render in the main panel of the GUI 200. In the example of FIG. 2, the seven wells rendered in the main panel of the GUI 200 may be within a radius of about a particular selected well. For example, the numbers 1.2 and 4.5 can represent distances (e.g., kilometers, etc.) about a selected well (e.g., first well in the GUI 200). In a depth view graphic of the GUI 200, seven layers are illustrated, each of which can be defined in part by a "top" (e.g., an uppermost boundary, etc.). As shown, a top of the third layer (e.g., interface between the second and third layers) may be of interest. As shown, lines can span between the well logs to correlate tops; noting that some of the well logs may not span the entire depth indicated in the depth view graphic.

The GUI 200 also includes various controls such as log type selection controls (see, e.g., All, GR, ND, Res, etc.). The GUI 200 may provide for workflow management, for example, consider controls for propagating markers, validating tops, etc. As an example, a framework may provide one or more features that can automate one or more portions of a workflow or workflows.

Figure 3:
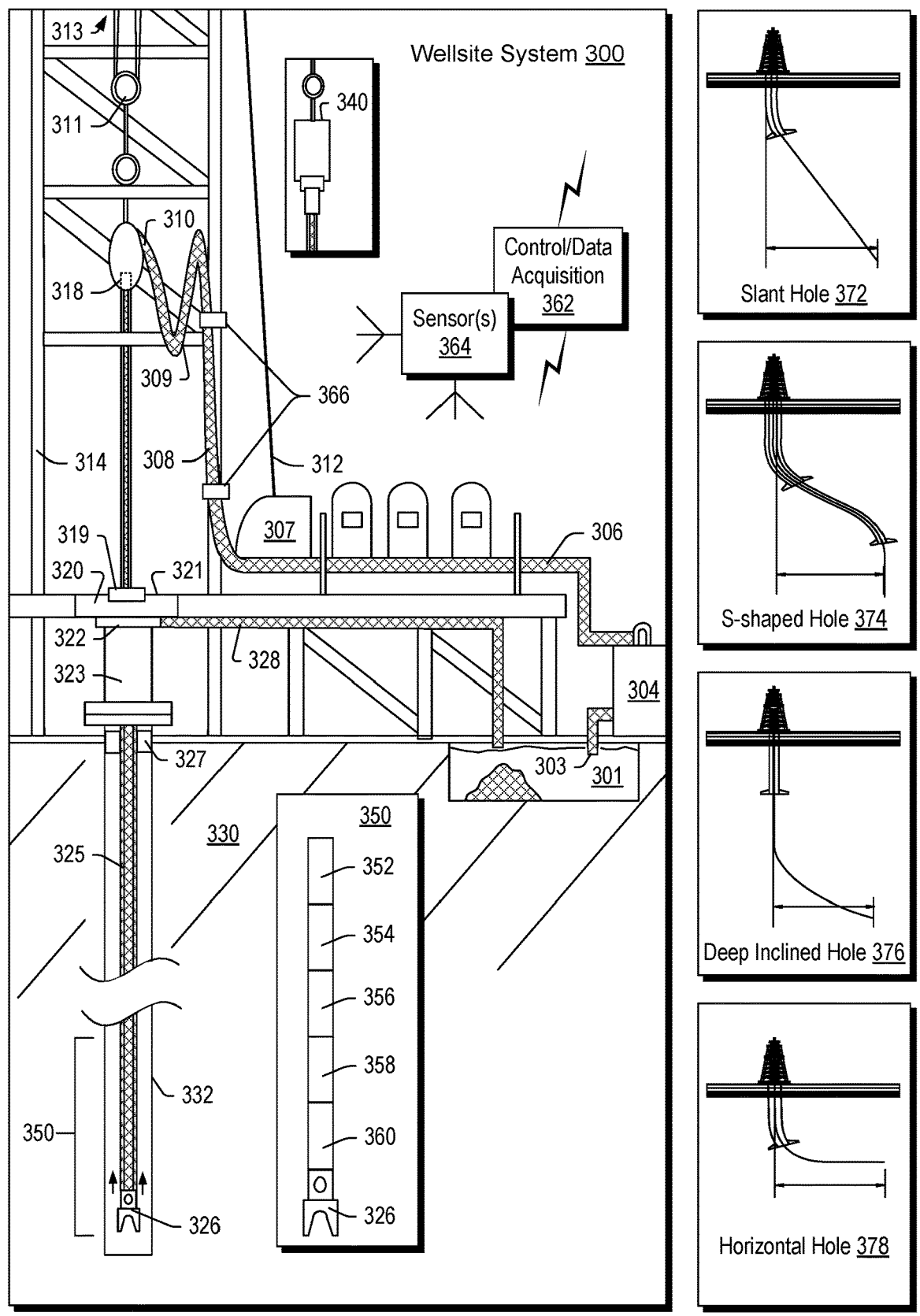
FIG. 3 illustrates examples of equipment including examples of downhole tools and examples of bores.
Figure 4:
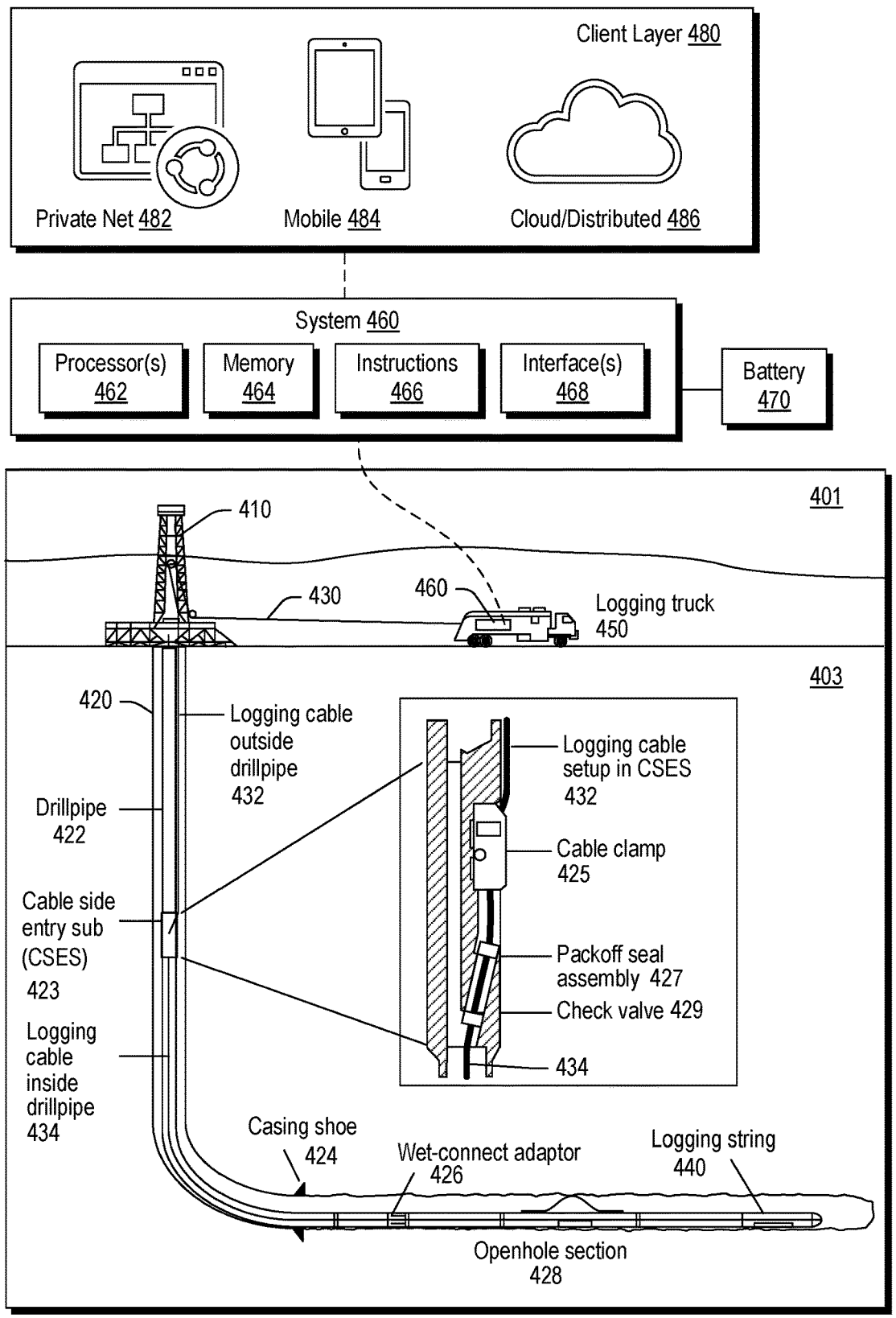
FIG. 4 illustrates examples of equipment including examples of downhole tools.

FIGS. 3 and 4 illustrate various examples of equipment that may be utilized in one or more workflows that include, at least in part, acquiring well log data. As an example, a method may be implemented during use of such equipment, using data acquired by such equipment, etc. As an example, the GUI 200 of FIG. 2 may be part of a workflow that includes field interaction (e.g., data acquisition, equipment control, etc.). As an example, the GUI 200 of FIG. 2 may be generated using a system such as the system 100 of FIG. 1.

FIG. 3 shows an example of a wellsite system 300 (e.g., at a wellsite that may be onshore or offshore). As shown, the wellsite system 300 can include a mud tank 301 for holding mud and other material (e.g., where mud can be a drilling fluid), a suction line 303 that serves as an inlet to a mud pump 304 for pumping mud from the mud tank 301 such that mud flows to a vibrating hose 306, a drawworks 307 for winching drill line or drill lines 312, a standpipe 308 that receives mud from the vibrating hose 306, a kelly hose 309 that receives mud from the standpipe 308, a gooseneck or goosenecks 310, a traveling block 311, a crown block 313 for carrying the traveling block 311 via the drill line or drill lines 312, a derrick 314, a kelly 318 or a top drive 340, a kelly drive bushing 319, a rotary table 320, a drill floor 321, a bell nipple 322, one or more blowout preventers (BOPs) 323, a drillstring 325, a drill bit 326, a casing head 327 and a flow pipe 328 that carries mud and other material to, for example, the mud tank 301.

In the example system of FIG. 3, a borehole 332 is formed in subsurface formations 330 by rotary drilling; noting that various example embodiments may also use one or more directional drilling techniques, equipment, etc.

As shown in the example of FIG. 3, the drillstring 325 is suspended within the borehole 332 and has a drillstring assembly 350 that includes the drill bit 326 at its lower end. As an example, the drillstring assembly 350 may be a bottom hole assembly (BHA).

The wellsite system 300 can provide for operation of the drillstring 325 and other operations. As shown, the wellsite system 300 includes the traveling block 311 and the derrick 314 positioned over the borehole 332. As mentioned, the wellsite system 300 can include the rotary table 320 where the drillstring 325 pass through an opening in the rotary table 320.

As shown in the example of FIG. 3, the wellsite system 300 can include the kelly 318 and associated components, etc., or the top drive 340 and associated components. As to a kelly example, the kelly 318 may be a square or hexagonal metal/alloy bar with a hole drilled therein that serves as a mud flow path. The kelly 318 can be used to transmit rotary motion from the rotary table 320 via the kelly drive bushing 319 to the drillstring 325, while allowing the drillstring 325 to be lowered or raised during rotation. The kelly 318 can pass through the kelly drive bushing 319, which can be driven by the rotary table 320. As an example, the rotary table 320 can include a master bushing that operatively couples to the kelly drive bushing 319 such that rotation of the rotary table 320 can turn the kelly drive bushing 319 and hence the kelly 318. The kelly drive bushing 319 can include an inside profile matching an outside profile (e.g., square, hexagonal, etc.) of the kelly 318; however, with slightly larger dimensions so that the kelly 318 can freely move up and down inside the kelly drive bushing 319.

As to a top drive example, the top drive 340 can provide functions performed by a kelly and a rotary table. The top drive 340 can turn the drillstring 325. As an example, the top drive 340 can include one or more motors (e.g., electric and/or hydraulic) connected with appropriate gearing to a short section of pipe called a quill, that in turn may be screwed into a saver sub or the drillstring 325 itself. The top drive 340 can be suspended from the traveling block 311, so the rotary mechanism is free to travel up and down the derrick 314. As an example, a top drive 340 may allow for drilling to be performed with more joint stands than a kelly/rotary table approach.

In the example of FIG. 3, the mud tank 301 can hold mud, which can be one or more types of drilling fluids. As an example, a wellbore may be drilled to produce fluid, inject fluid or both (e.g., hydrocarbons, minerals, water, etc.).

In the example of FIG. 3, the drillstring 325 (e.g., including one or more downhole tools) may be composed of a series of pipes threadably connected together to form a long tube with the drill bit 326 at the lower end thereof. As the drillstring 325 is advanced into a wellbore for drilling, at some point in time prior to or coincident with drilling, the mud may be pumped by the pump 304 from the mud tank 301 (e.g., or other source) via a the lines 306, 308 and 309 to a port of the kelly 318 or, for example, to a port of the top drive 340. The mud can then flow via a passage (e.g., or passages) in the drillstring 325 and out of ports located on the drill bit 326 (see, e.g., a directional arrow). As the mud exits the drillstring 325 via ports in the drill bit 326, it can then circulate upwardly through an annular region between an outer surface(s) of the drillstring 325 and surrounding wall(s) (e.g., open borehole, casing, etc.), as indicated by directional arrows. In such a manner, the mud lubricates the drill bit 326 and carries heat energy (e.g., frictional or other energy) and formation cuttings to the surface where the mud (e.g., and cuttings) may be returned to the mud tank 301, for example, for recirculation (e.g., with processing to remove cuttings, etc.).

The mud pumped by the pump 304 into the drillstring 325 may, after exiting the drillstring 325, form a mudcake that lines the wellbore which, among other functions, may reduce friction between the drillstring 325 and surrounding wall(s) (e.g., borehole, casing, etc.). A reduction in friction may facilitate advancing or retracting the drillstring 325. During a drilling operation, the entire drillstring 325 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 326 of the drillstring 325 at a bottom of a wellbore, pumping of the mud commences to lubricate the drill bit 326 for purposes of drilling to enlarge the wellbore. As mentioned, the mud can be pumped by the pump 304 into a passage of the drillstring 325 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 325) may be transmitted uphole to an uphole device, which may relay such information to other equipment for processing, control, etc.

As an example, telemetry equipment may operate via transmission of energy via the drillstring 325 itself. For example, consider a signal generator that imparts coded energy signals to the drillstring 325 and repeaters that may receive such energy and repeat it to further transmit the coded energy signals (e.g., information, etc.).

As an example, the drillstring 325 may be fitted with telemetry equipment 352 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 3, an uphole control and/or data acquisition system 362 may include circuitry to sense pressure pulses generated by telemetry equipment 352 and, for example, communicate sensed pressure pulses or information derived therefrom for process, control, etc.

The assembly 350 of the illustrated example includes a logging-while-drilling (LWD) module 354, a measurement-while-drilling (MWD) module 356, an optional module 358, a rotary-steerable system (RSS) and/or motor 360, and the drill bit 326. Such components or modules may be referred to as tools where a drillstring can include a plurality of tools.

As to a RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

A RSS can drill directionally where there is continuous rotation from surface equipment, which can alleviate the sliding of a steerable motor (e.g., a PDM). A RSS may be deployed when drilling directionally (e.g., deviated, horizontal, or extended-reach wells). A RSS can aim to minimize interaction with a borehole wall, which can help to preserve borehole quality. A RSS can aim to exert a relatively consistent side force akin to stabilizers that rotate with the drillstring or orient the bit in the desired direction while continuously rotating at the same number of rotations per minute as the drillstring.

The LWD module 354 may be housed in a suitable type of drill collar and can contain one or a plurality of selected types of logging tools. It will also be understood that more than one LWD and/or MWD module can be employed, for example, as represented at by the module 356 of the drillstring assembly 350. Where the position of an LWD module is mentioned, as an example, it may refer to a module at the position of the LWD module 354, the module 356, etc. An LWD module can include capabilities for measuring, processing, and storing information, as well as for communicating with the surface equipment. In the illustrated example, the LWD module 354 may include a seismic measuring device.

The MWD module 356 may be housed in a suitable type of drill collar and can contain one or more devices for measuring characteristics of the drillstring 325 and the drill bit 326. As an example, the MWD tool 354 may include equipment for generating electrical power, for example, to power various components of the drillstring 325. As an example, the MWD tool 354 may include the telemetry equipment 352, for example, where the turbine impeller can generate power by flow of the mud; it being understood that other power and/or battery systems may be employed for purposes of powering various components. As an example, the MWD module 356 may include one or more of the following types of measuring devices: a weight-on-bit measuring device, a torque measuring device, a vibration measuring device, a shock measuring device, a stick slip measuring device, a direction measuring device, and an inclination measuring device.

FIG. 3 also shows some examples of types of holes that may be drilled. For example, consider a slant hole 372, an S-shaped hole 374, a deep inclined hole 376 and a horizontal hole 378.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 3, the wellsite system 300 can include one or more sensors 364 that are operatively coupled to the control and/or data acquisition system 362. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 300. As an example, a sensor or sensor may be at an offset wellsite where the wellsite system 300 and the offset wellsite are in a common field (e.g., oil and/or gas field).

As an example, one or more of the sensors 364 can be provided for tracking pipe, tracking movement of at least a portion of a drillstring, etc.

As an example, the system 300 can include one or more sensors 366 that can sense and/or transmit signals to a fluid conduit such as a drilling fluid conduit (e.g., a drilling mud conduit). For example, in the system 300, the one or more sensors 366 can be operatively coupled to portions of the standpipe 308 through which mud flows. As an example, a downhole tool can generate pulses that can travel through the mud and be sensed by one or more of the one or more sensors 366. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 300 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

FIG. 4 shows an example of an environment 401 that includes a subterranean portion 403 where a rig 410 is positioned at a surface location above a bore 420. In the example of FIG. 4, various wirelines services equipment can be operated to perform one or more wirelines services including, for example, acquisition of data from one or more positions within the bore 420.

In the example of FIG. 4, the bore 420 includes drillpipe 422, a casing shoe, a cable side entry sub (CSES) 423, a wet-connector adaptor 426 and an openhole section 428. As an example, the bore 420 can be a vertical bore or a deviated bore where one or more portions of the bore may be vertical and one or more portions of the bore may be deviated, including substantially horizontal.

In the example of FIG. 4, the CSES 423 includes a cable clamp 425, a packoff seal assembly 427 and a check valve 429. These components can provide for insertion of a logging cable 430 that includes a portion 432 that runs outside the drillpipe 422 to be inserted into the drillpipe 422 such that at least a portion 434 of the logging cable runs inside the drillpipe 422. In the example of FIG. 4, the logging cable 430 runs past the wet-connect adaptor 426 and into the openhole section 428 to a logging string 440.

As shown in the example of FIG. 4, a logging truck 450 (e.g., a wirelines services vehicle) can deploy the wireline 430 under control of a system 460. As shown in the example of FIG. 4, the system 460 can include one or more processors 462, memory 464 operatively coupled to at least one of the one or more processors 462, instructions 466 that can be, for example, stored in the memory 464, and one or more interfaces 468. As an example, the system 460 can include one or more processor-readable media that include processor-executable instructions executable by at least one of the one or more processors 462 to cause the system 460 to control one or more aspects of equipment of the logging string 440 and/or the logging truck 450. In such an example, the memory 464 can be or include the one or more processor-readable media where the processor-executable instructions can be or include instructions. As an example, a processor-readable medium can be a computer-readable storage medium that is not a signal and that is not a carrier wave.

FIG. 4 also shows a battery 470 that may be operatively coupled to the system 460, for example, to power the system 460. As an example, the battery 470 may be a back-up battery that operates when another power supply is unavailable for powering the system 460 (e.g., via a generator of the wirelines truck 450, a separate generator, a power line, etc.). As an example, the battery 470 may be operatively coupled to a network, which may be a cloud network. As an example, the battery 470 can include smart battery circuitry and may be operatively coupled to one or more pieces of equipment via a SMBus or other type of bus.

As an example, the system 460 can be operatively coupled to a client layer 480. In the example of FIG. 4, the client layer 480 can include features that allow for access and interactions via one or more private networks 482, one or more mobile platforms and/or mobile networks 484 and via the "cloud" 486, which may be considered to include distributed equipment that forms a network such as a network of networks. As an example, the system 460 can include circuitry to establish a plurality of connections (e.g., sessions). As an example, connections may be via one or more types of networks. As an example, connections may be client-server types of connections where the system 460 operates as a server in a client-server architecture. For example, clients may log-in to the system 460 where multiple clients may be handled, optionally simultaneously.

As to types of measurements, these can include, for example, one or more of resistivity, gamma ray, density, neutron porosity, spectroscopy, sigma, magnetic resonance, elastic waves, pressure, and sample data (e.g., as may be acquired while drilling to enable timely quantitative formation evaluation).

As an example, data can include geochemical data. For example, consider data acquired using X-ray fluorescence (XRF) technology, Fourier transform infrared spectroscopy (FTIR) technology and/or wireline geochemical technology.

XRF technology involves emission of characteristic "secondary" (or fluorescent) X-rays from a material that has been excited by bombardment with high-energy X-rays or gamma rays. XRF technology may be implemented for elemental analysis and chemical analysis, for example, as to research in geochemistry. As an example, in core analysis, XRF technology may be implemented to help determine mineral content. For example, elemental volumes may be inverted to mineral volumes by assuming certain standard formulae for mineral composition.

FTIR technology can involve analysis of an infrared spectrum of absorption, emission, photoconductivity or Raman scattering of a solid, liquid or gas. As an example, FTIR may be applied as a technique for quantitative mineralogical analysis of a sample of rock by measuring the effect of midrange infrared radiation transmitted through the sample. In such an example, the radiation excites vibrations in the chemical bonds within the mineral molecules at particular frequencies characteristic of each bond. The transmitted radiation may be compared with spectral standards for a variety of minerals, for example, to determine abundance of one or more minerals in the sample. As to sample preparation, consider, as an example, grinding a core plug to provide a representative sample that may be dispersed in a potassium bromide matrix and then subject to measurement and analysis.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool. As an example, a workflow may include emission of neutrons by a pulsed neutron generator (PNG) of a tool to induce emission of gamma rays from a formation via interactions such as inelastic scattering interactions and thermal neutron capture interactions, which can produce gamma rays with a specific set of characteristic energies. In turn, gamma rays may be detected by a $LaBr_3$:Ce scintillator coupled to a high-temperature spectroscopy photomultiplier, producing signals that can be integrated, digitized, and processed by a high-performance pulse-height analyzer. Such an analyzer may determine, for example, pulse height (proportional to energy) of individually detected gamma rays and accumulate pulse-height histograms (spectra) that tally counts versus pulse height. Spectra may be acquired, for example, during and after each neutron burst, which helps to enable separation of inelastic and capture gamma rays. As an example, an individual spectrum may be decomposed into a linear combination of standard spectra from individual elements, which can involve adjustment for one or more environmental and/or electronic factors. As an example, coefficients of linear combination of standard spectra may be converted to elemental weight fractions, for example, via a modified geochemical oxides closure model, an inversion approach, etc. As to interpretation, various approaches may be implemented to generate mineralogy and lithologic fractions from the elemental concentration logs. As an example, a sequential spectral lithographic processing approach may be used, which is based on the derivation of empirical relationships between elemental concentrations and mineral concentrations. As another example, an iterative inversion technique may be implemented (e.g., consider the TECHLOG QUANTI multicomponent inversion ELAN module).

As an example, a method may include acquiring data (e.g., and/or receiving data) as measured via one or more techniques. Such techniques may include a micro-resistivity technique, a density and photoelectric factor or index technique, an image calibration technique, a dielectric and conductivity dispersion technique, a neutron porosity technique, an ultrasound technique, etc.

As an example, a workflow may utilize geochemical data, and optionally other data, for one or more processes (e.g., stratigraphic modeling, basin modeling, completion designs, drilling, production, injection, etc.). As an example, lithology scanner tool data may be used in a workflow or workflows that implement one or more frameworks Table 1, below, shows some examples of data, which may be referred to as "log" data (e.g., well log data) that are associated with petrophysical and rock physics properties calculation and analysis.

TABLE 1

Examples of Log Data

| Name | Uses |
| --- | --- |
| Gamma Ray (GR) | Lithology interpretation, shale volume calculation, calculate clay volume, permeability calculation, porosity calculation, wave velocity calculation, etc. |
| Spontaneous Potential (SP) | Lithology interpretation, Rw and Rwe calculation, detect permeable zone, etc. |
| Caliper (CALI) | Detect permeable zone, locate a bad hole |
| Shallow Resistivity (LLS and ILD) | Lithology interpretation, finding hydrocarbon bearing zone, calculate water saturation, etc. |
| Deep Resistivity (LLD and ILD) | Lithology interpretation, finding hydrocarbon bearing zone, calculate water saturation, etc. |
| Density (RHOB) | Lithology interpretation, finding hydrocarbon bearing zone, porosity calculation, rock physics properties (AI, SI, σ, etc.) calculation, etc. |
| Neutron Porosity (NPHI) | Finding hydrocarbon bearing zone, porosity calculation, etc. |
| Sonic (DT) | Porosity calculation, wave velocity calculation, rock physics properties (AI, SI, σ, etc.) calculation, etc. |
| Photoelectric (PEF) | Mineral determination (for lithology interpretation) |

FIGS. 1, 3 and 4 show various examples of equipment in various examples of environments where, for example, acquired data may be utilized in one or more frameworks, which may include a framework for well correlation, etc. (see, e.g., the GUI 200 of FIG. 2). As an example, one or more workflows may be implemented to perform operations using equipment in one or more environments. As an example, a workflow may aim to understand an environment. As an example, a workflow may aim to drill into an environment, for example, to form a bore defined by surrounding earth (e.g., rock, fluids, etc.). As an example, a workflow may aim to acquire data from a downhole tool disposed in a bore where such data may be acquired via a drilling tool (e.g., as part of a bottom hole assembly) and/or a wireline tool. As an example, a workflow may aim to support a bore, for example, via casing. As an example, a workflow may aim to fracture an environment, for example, via injection of fluid. As an example, a workflow may aim to produce fluids from an environment via a bore. As an example, a workflow may utilize one or more frameworks that operate at least in part via a computer (e.g., a computing device, a computing system, etc.).

As mentioned, a log can be a well log. A well log can be, for example, a series of measurements versus depth or time, or both, of one or more physical quantities in or around a well. A log can be a recording of information as acquired via one or more sensors. As mentioned, as to a gamma ray sensor, gamma rays may be detected by a $LaBr_3$:Ce scintillator coupled to a high-temperature spectroscopy photomultiplier, producing signals that can be integrated, digitized, and processed by a high-performance pulse-height analyzer. In such an example, a well log can be a record (e.g., a recording) of sensor signal-based output. Transmission of signals and/or signal-based output from a device may be via fiber, wire and/or wireless machinery. For example, circuitry may be utilized that includes one or more wires and/or fibers that can transmit signals and/or signal-based output electrically and/or optically. As to wireless transmission, one or more antennas may be utilized that can receive and/or transmit electromagnetic energy that includes signals and/or signal-based output. As an example, wireless transmission may be via a medium such as a drilling fluid (e.g., mud, etc.). In such an example, mud pulses may be utilized in a process known as mud-pulse telemetry.

As an example, a log may be a depth series of data. For example, consider a log as a depth series of data with respect to true vertical depth (TVD). TVD can be defined as the vertical distance from a point in a well to a point at the surface, which may be associated with a piece of equipment (e.g., elevation of the rotary kelly bushing (RKB) also known as a rotary bushing or kelly drive bushing). TVD is a type of depth measurement that can be used by a driller; while, another type is measured depth (MD). TVD can be utilized in determining pressures, which are caused in part by the hydrostatic head of fluid in a wellbore. Measured depth (MD), due to intentional and/or unintentional curves in a wellbore tends to be longer than true vertical depth (TVD). As an example, in a framework such as the PETREL framework, various depth tracks may exist for a plurality of wells, which may be given in standard sea level true vertical depth (SSTVD) where sea level is a common reference elevation for each of the wells, which may start at different depths and have different scales. As an example, one or more well logs may be accessed where data are given as a function of MD. In such an example, where coordinates of corresponding well trajectories are known (e.g., accessible), a method can include transforming the well logs from being a function of MD to being a function of TVD, for example, as TVD below sea level (BSL or b.s.l.). As an example, for a geographic region, elevation of formation tops may varies by hundreds of meters where an SSTVD-based scale can facilitate comparisons between "common" features in well logs (e.g., via a propagation process, etc.). While SSTVD is mentioned, the acronym TVDSS may be utilized to represent TVD minus the elevation above mean sea level of a depth reference point of a well (e.g., TVD subsea). As mentioned, a depth reference point may be a kelly drive bushing or another portion of well-related equipment (e.g., drill floor, etc.).

As explained, as a well may deviate from vertical, there may be a measured depth (MD) for a point measured along a path of a wellbore and a true vertical depth (TVD) as an absolute vertical distance between a datum and a point in the wellbore. A datum may be selected from various data such as ground level (GL), drilling rig floor (DF), rotary table (RT), kelly bushing (KB or RKB), mean sea level (MSL), etc.

As an example, a method may implement a process referred to as elevation correction. Such a process may involve using a compensating factor to bring measurements to a common datum or reference plane. Well log headers of well log data files can include an elevation such as that of a drilling rig's kelly drive bushing and, for example, height of rig location above sea level, so that well log depths can be elevation corrected to sea level.

Figure 5:
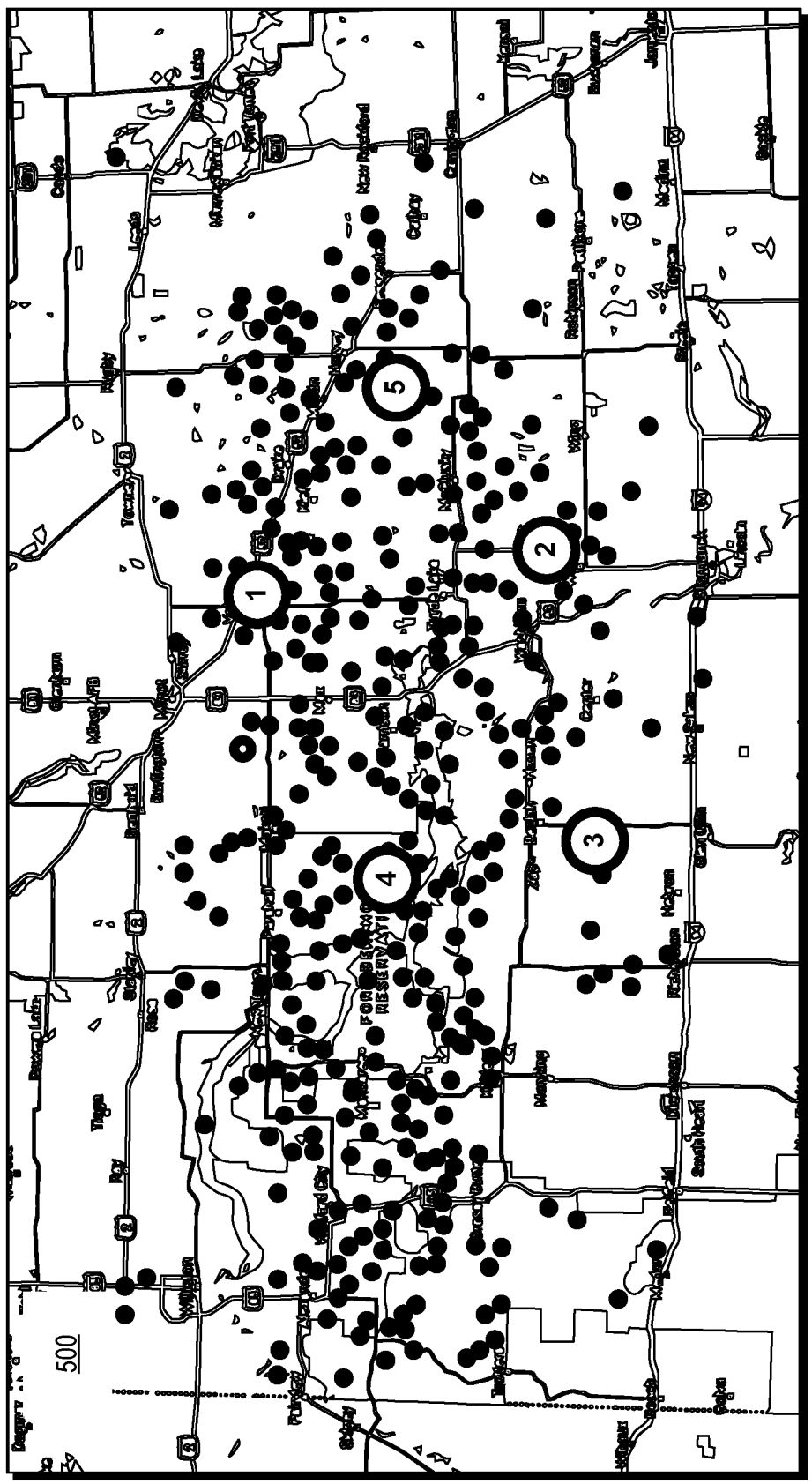
FIG. 5 illustrates an example of a graphical user interface (GUI) of a map of a field that includes wells.

FIG. 5 shows an example of a graphical user interface 500 that includes a graphical representation of a map of a field where solid circles represent wells and where open circles with numbers (e.g., 1, 2, 3, 4 and 5) indicate wells with logs that have been picked such that one or more tops have been marked as corresponding to one or more subsurface layers. As explained, a workflow may include picking a number N of total wells W for a top where the picked number N can be utilized in a well correlation workflow to identify the top in a number of the wells W (e.g., W-N wells).

Figure 6:
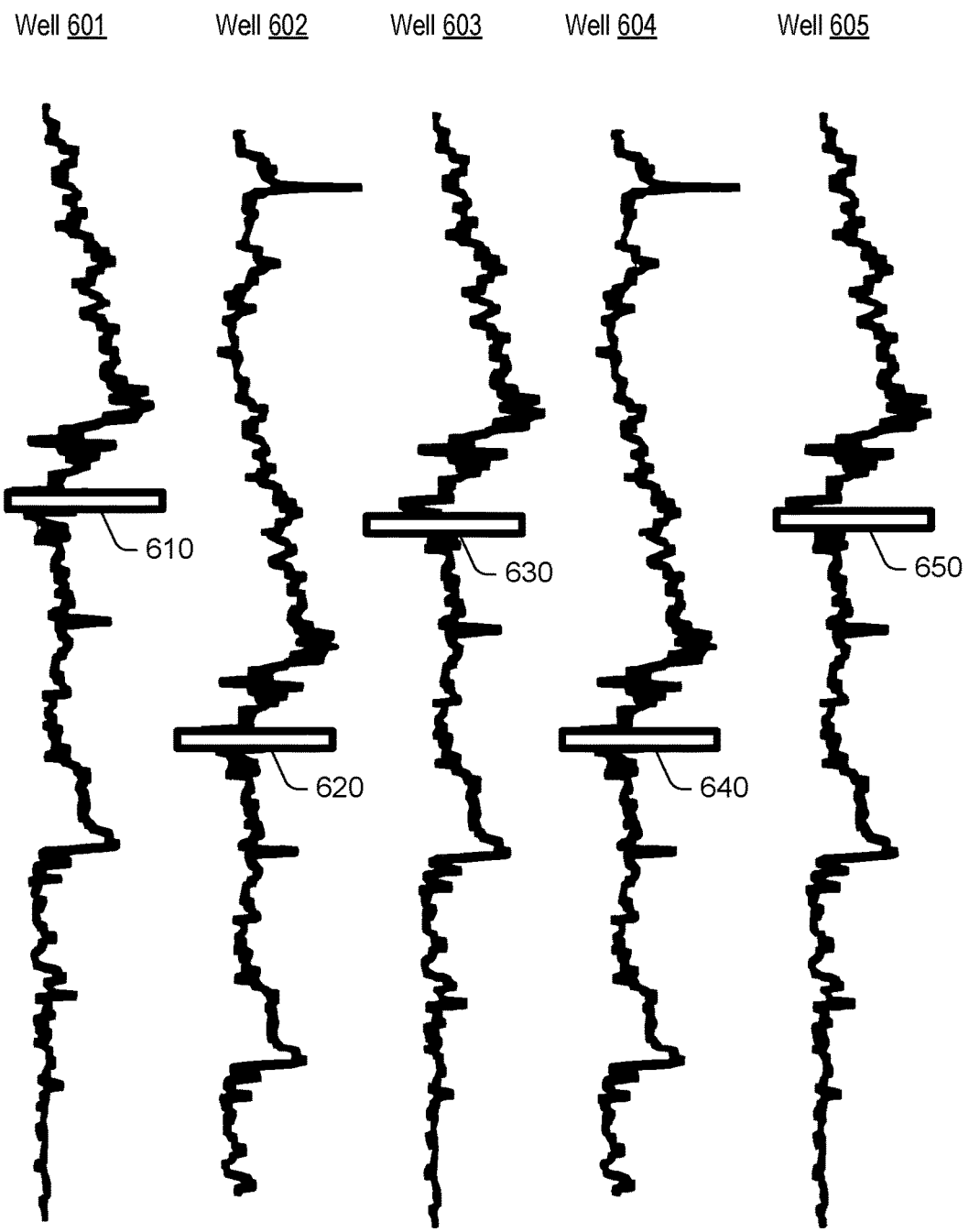
FIG. 6 illustrates examples of well logs that include one or more well log marker windows.

FIG. 6 shows an example of a graphical user interface 600 that includes logs for wells 601, 602, 603, 604 and 605 where a top marker 610, 620, 630, 640 and 650 exists for each of the wells 601, 602, 603, 604 and 605.

As an example, a method can include assessing top markers of well logs for suitability for a well correlation workflow. For example, consider a method that can generate one or more metrics for comparing picked top markers for wells.

As an example, a method can include implementing a self-supervised learning of log similarity using one or more machine learning models. For example, consider a Siamese-Bidirectional Encoder Representation from Transformers (Siamese-BERT or Si-BERT) technique that can provide for inlier and/or outlier detection for marker quality control and/or log correlation assessment workflows.

Various Siamese-BERT approaches have been applied in natural language processing (NLP), for example, to characterize sentences. For example, BERT can be applied in an NLP context to take into account context for each occurrence of a given word. In comparison to a word2vec approach, where a vector for the word "running" can have the same word2vec vector representation for its occurrences in two different sentences, "he is running a company" and "he is running a marathon", BERT can provide a contextualized embedding that will be different according to the sentence.

As an example, BERT can be implemented as a stack of Transformer encoder layers that can include multiple self-attention "heads" where, for every input token in a sequence, each head computes key, value and query vectors, used to create a weighted representation. The outputs of heads in the same layer can be combined and run through a fully-connected layer. Each layer can be wrapped with a skip connection and followed by layer normalization. As an example, a BERT workflow can include one or more stages, for example, consider pre-training and fine-tuning stages. In such an example, pretraining can use two self-supervised tasks: masked language modeling (MLM, prediction of randomly masked input tokens) and next sentence prediction (NSP, predicting if two input sentences are adjacent to each other); whereas, in fine-tuning for downstream applications, one or more fully-connected layers can be added on top of the final encoder layer. As an example, input representations can be computed where each word in the input is first tokenized into wordpieces and then three embedding layers (token, position, and segment) are combined to obtain a fixed-length vector. During pre-training, a BERT model can be trained on unlabeled data over different pre-training tasks and, for finetuning, the BERT model can be initialized with the pre-trained parameters where the parameters are fine-tuned using labeled data from downstream tasks where, for example, each downstream task can have a separate fine-tuned model, even though they are initialized with the same pre-trained parameters.

The BERT model architecture can be a multi-layer bidirectional transformer encoder. For example, in the NLP context, consider an architecture with 12 encoders with 12 bidirectional self-attention heads and 110 million parameters, an architecture with 24 encoders with 24 bidirectional self-attention heads and 340 million parameters.

As an example, one or more machine learning models can provide for assessing well logs such as, for example, assessing log similarity (e.g., and/or dissimilarity). Understanding the similarity/dissimilarity of sub-sections of logs can be useful for numerous applications. For example, consider inlier and/or outlier detection for markers for well correlation applications (e.g., marker quality control).

As may be observed in real-world datasets, well tops marked on well logs tend to be noisy due to various reasons such as, for example, interpreter bias, inaccurate labeling, etc. As to labeling issues, such issues may arise in at least in part due to acquisition noise. Such noise may impact coding, recoding, etc., for example, as to data (e.g., labels, etc.). Training a supervised model on labels subject to labeling issues can lead to degraded performance in log correlation. Hence, to improve log correlation tasks, noisy markers may be identified and marked (e.g., for further analysis, etc.). As an example, a quality control (QC) tool can also be utilized in assessing a supervised model result such as, for example, in validating a supervised model result.

As an example, a machine learning model based technique can be implemented to identify (e.g., and remove) noisy markers. Such a technique may include implementing a Siamese-BERT based self-supervised feature learning method to learn log similarity that, in-turn, can be used for markerQC.

As explained, in the NLP context, BERT can pre-train deep bidirectional representations from a large corpus of unlabeled text with a self-supervised strategy. Due to the self-attention component, BERT is able to model long term dependences in the sequences. Fine tuning of a pre-trained BERT model has shown state-of-the-art results on a wide range of NLP tasks.

As explained, well logs can be acquired with respect to time and/or depth. For example, consider a wireline workflow where a tool is deployed via wireline in a borehole and controlled via a motorized reel, which may aim to move the tool at a constant velocity or at different velocities (e.g., inwardly and/or outwardly). In such an example, data may be represented with respect to time and/or depth (e.g., measured depth, etc.). Such data may be referred to as series data, which may be time-series and/or depth-series data. As an example, a method can employ representation learning using BERT for time-series and/or depth-series data such as well logs (e.g., well log data).

As a pre-trained NLP BERT model is not suitable for a well log context, a specialized BERT model is generated, which can be trained using a self-supervised learning methodology. For example, consider using BERT within a Siamese model to learn vector representations that encode the similarity of input well log sequences. As an example, such vector representations may be utilized in a markerQC workflow.

Figure 7:
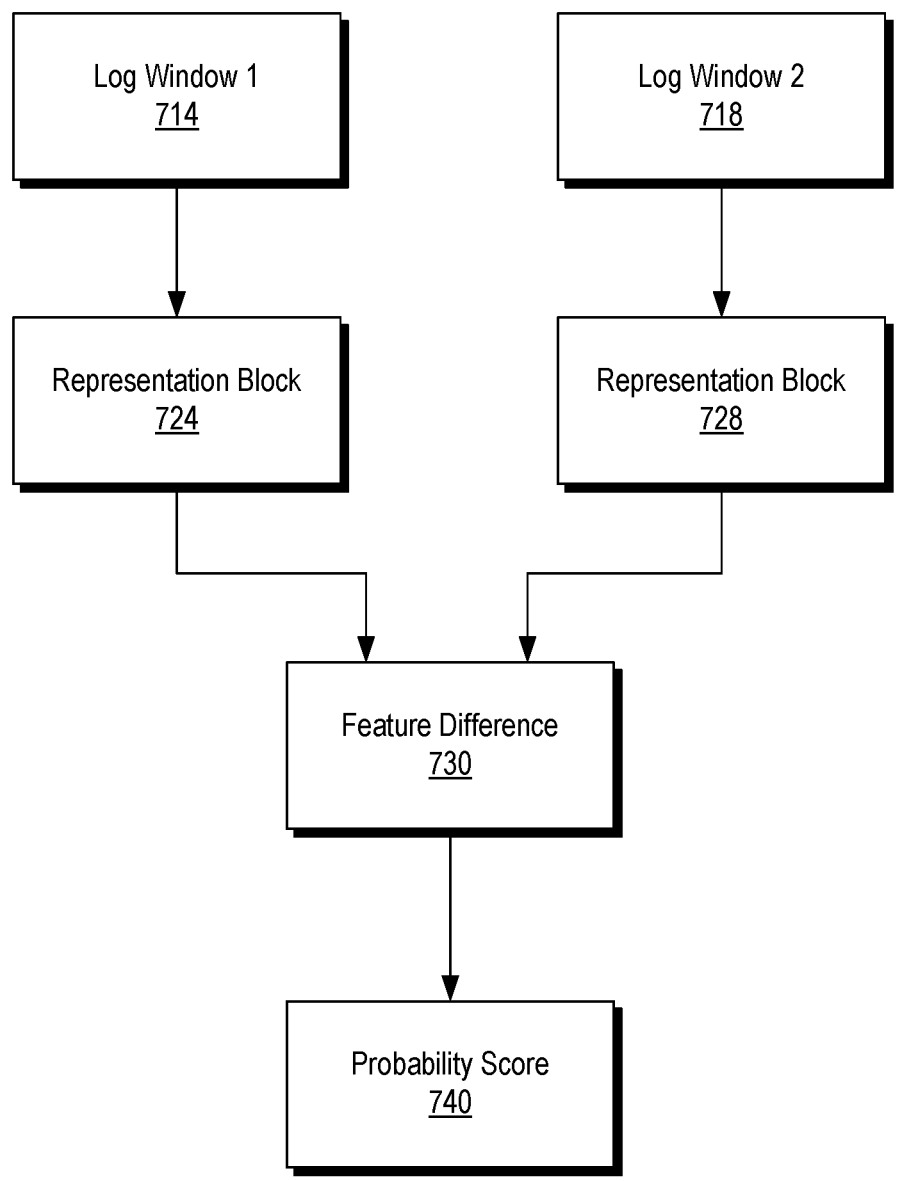
FIG. 7 illustrates an example of a method.

FIG. 7 shows an example of a method 700 for a Siamese Neural Network (SNN) architecture that can be utilized for learning log similarity. As shown, log window blocks 714 and 718 can receive a first portion of log data of a first well log (e.g., log window 1) and can receive a second portion of log data of a second well log (e.g., log window 2). In such an example, each portion of log data can encompass a marker and/or a suspected marker (e.g., a well top, etc.). In such an example, each portion of log data can be series data, which may include a number of 1D data points with respect to time and/or depth. As an example, a number of data points (e.g., window size, etc.) may be selectable and range from approximately three to several hundred or more. In the example of FIG. 7, representation blocks 724 and 728 can generate vector representations of the two log windows of blocks 714 and 718. These vector representations can then be compared via a feature difference block 730 where output thereof may be a probability score per a probability score block 740.

Figure 8:
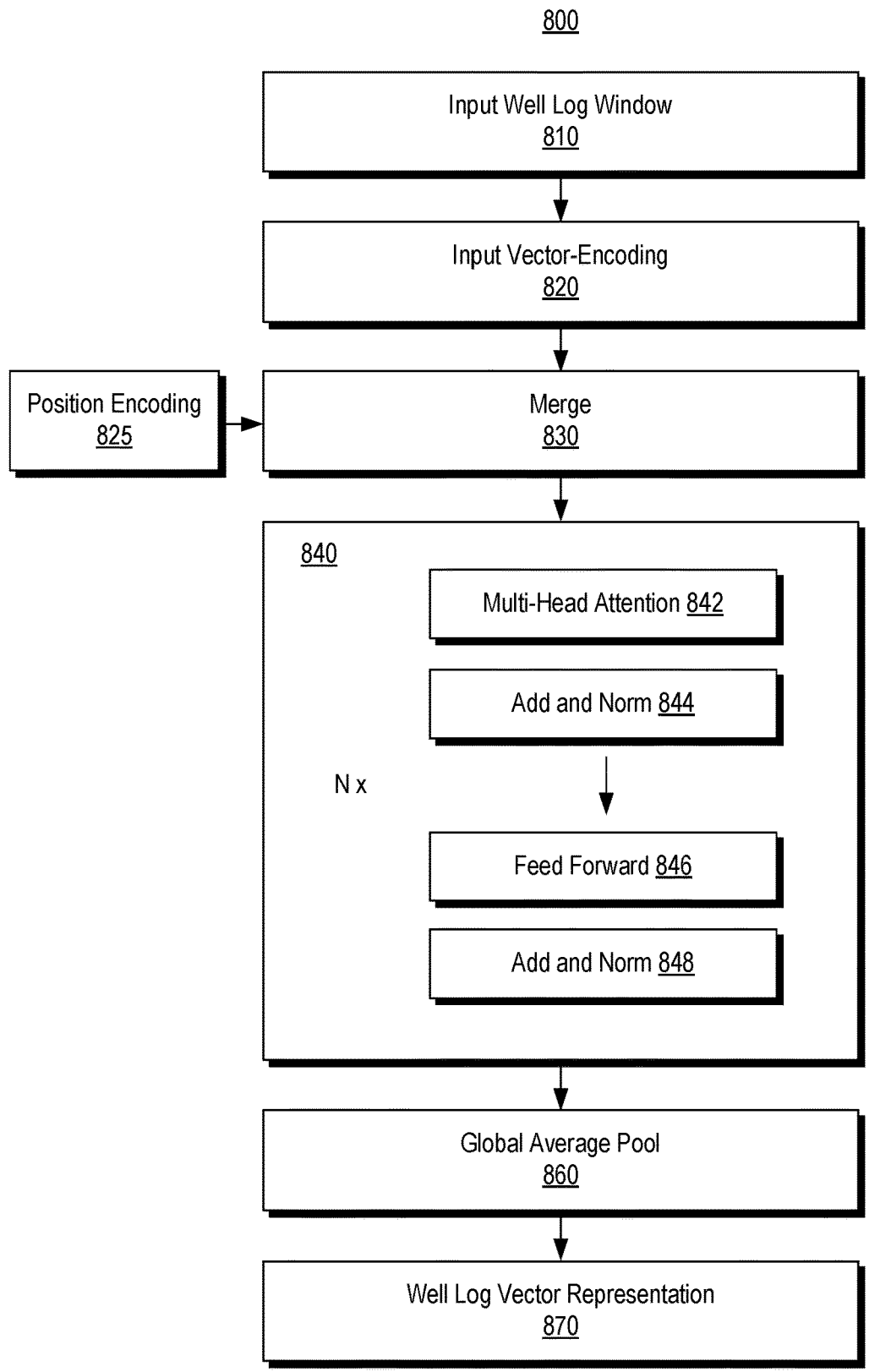
FIG. 8 illustrates an example of a method.

FIG. 8 shows an example of a method 800 that employs a BERT architecture, which is used for the representation blocks 724 and 728. As shown in FIG. 8, to obtain the vector representation of a log window per a log vector representation block 870, an input block 810 receives a log window where the log window is passed through a log window encoding layer 820 together with position encoding 825 and merge 830 and then several BERT layers 840 prior to processing by an average pooling layer 860. As shown, the BERT layers 840 can include multi-head attention 842, feed forward 846 and add and normalize components 844 and 848.

As to position encoding per the block 825, which can be in terms of sine and cosine signals of varied frequencies, these can be combined with the input log vector-encoding per the block 820 before input to the BERT block 840. For example, position encoding and skip connections can help the BERT block 840 to retain and propagate sequence information throughout the BERT model.

As to training the SNN model on well log data, such training can include generating and providing labeled samples. For learning the reliable estimates for similarity, the model demands training with a relatively large amount of labeled well log signature pairs. However, collecting such manually labeled data is laborious, costly and time consuming. As an example, to increase efficiency, a method can implement a self-supervised learning strategy. In such an example, self-learning can synthetically generate labels through data transformations to enable subsequent supervised training.

As an example, a method can include generating positive and negative pairs from unlabeled well logs for training an SNN model. For example, consider selecting a log window (W1) randomly or otherwise over a well log. In such an example, a method can include applying transformations such as compression/expansion and/or adding zero mean Gaussian noise to the well log and selecting a corresponding log window (W2). The selected pair (W1, W2) can form a positive training pair. As to negative sampling, a method can choose another log window (W3) randomly or otherwise over the well log where a pair (W1, W3) forms a negative training pair. An SNN model may then be trained on a number of such labeled pairs as can be generated from a large pool of unlabeled wells from one or more well log datasets. In such an example, the trained SNN model can be used to query a large database for specific well log patterns.

Figure 9:
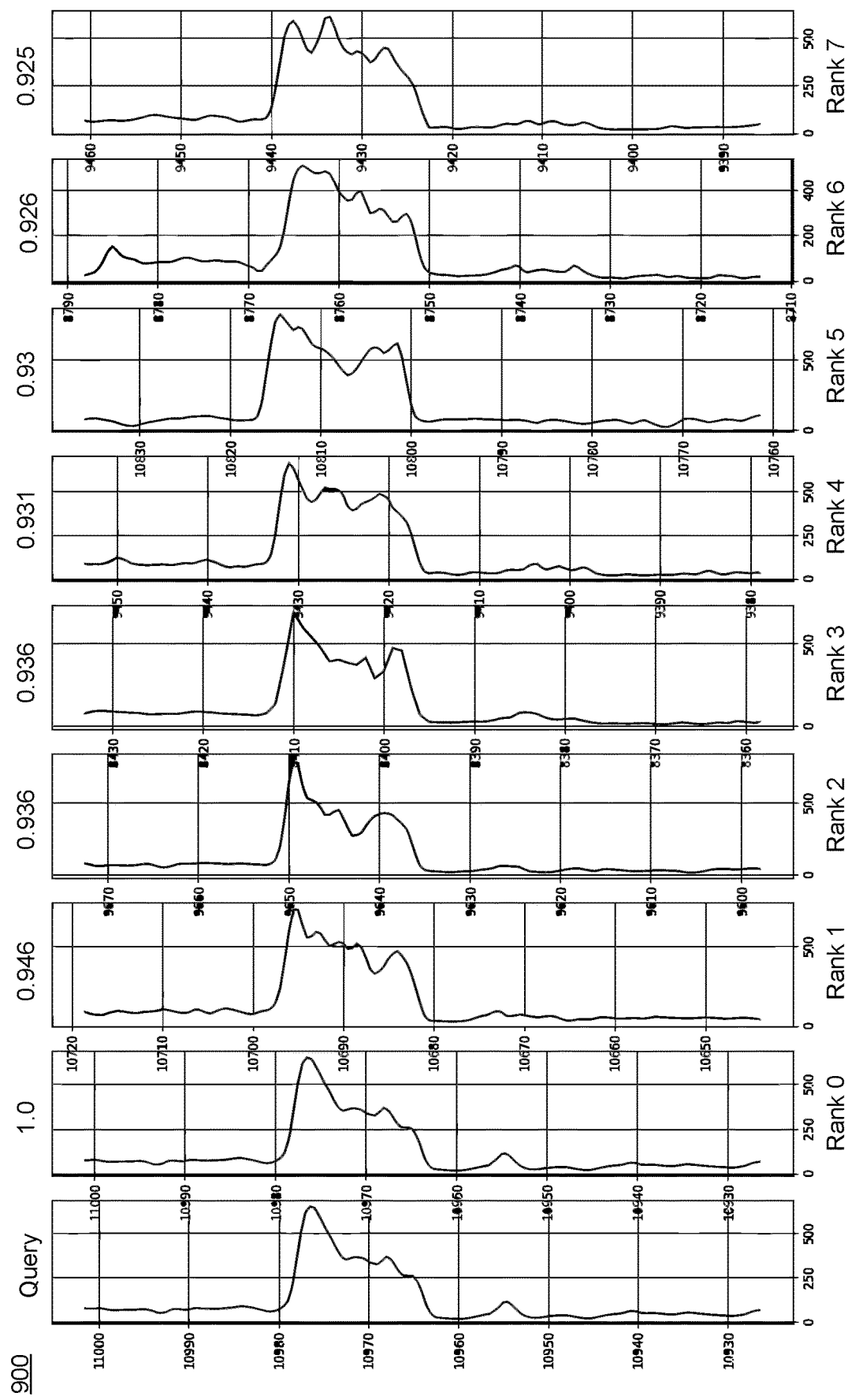
FIG. 9 illustrates examples of scored and ranked well logs.
Figure 10:
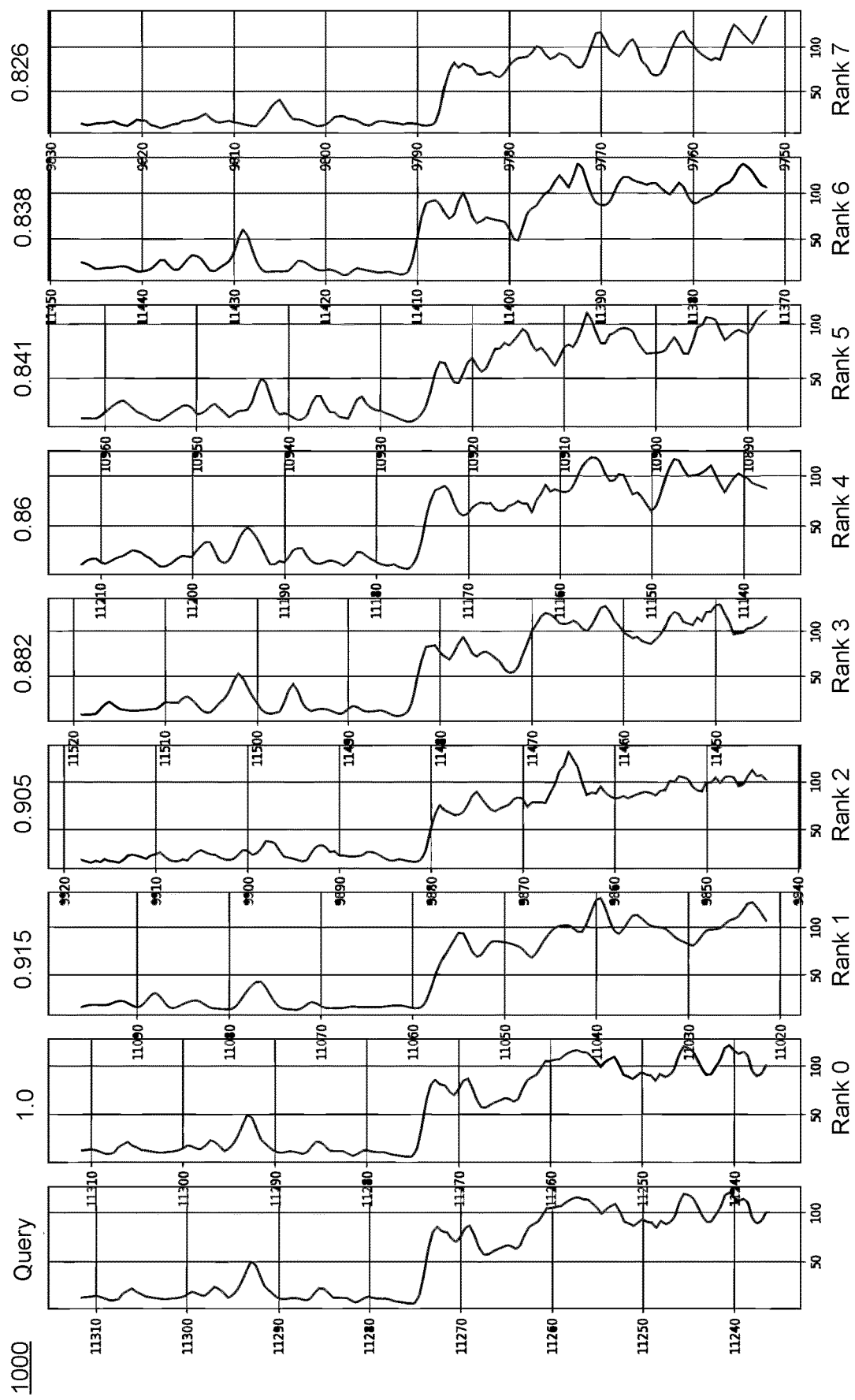
FIG. 10 illustrates examples of scored and ranked well logs.

FIGS. 9 and 10 show series of well logs 900 and 1000 with associated scores and rank with respect to a query well log. As shown, a Siamese-BERT approach can be effective for well log similarity learning where a method can include using different query log windows as a reference. In FIG. 9, the query well log is from a strong signature marker while, in FIG. 10, the query well log is from a subtle signature marker.

Figure 11:
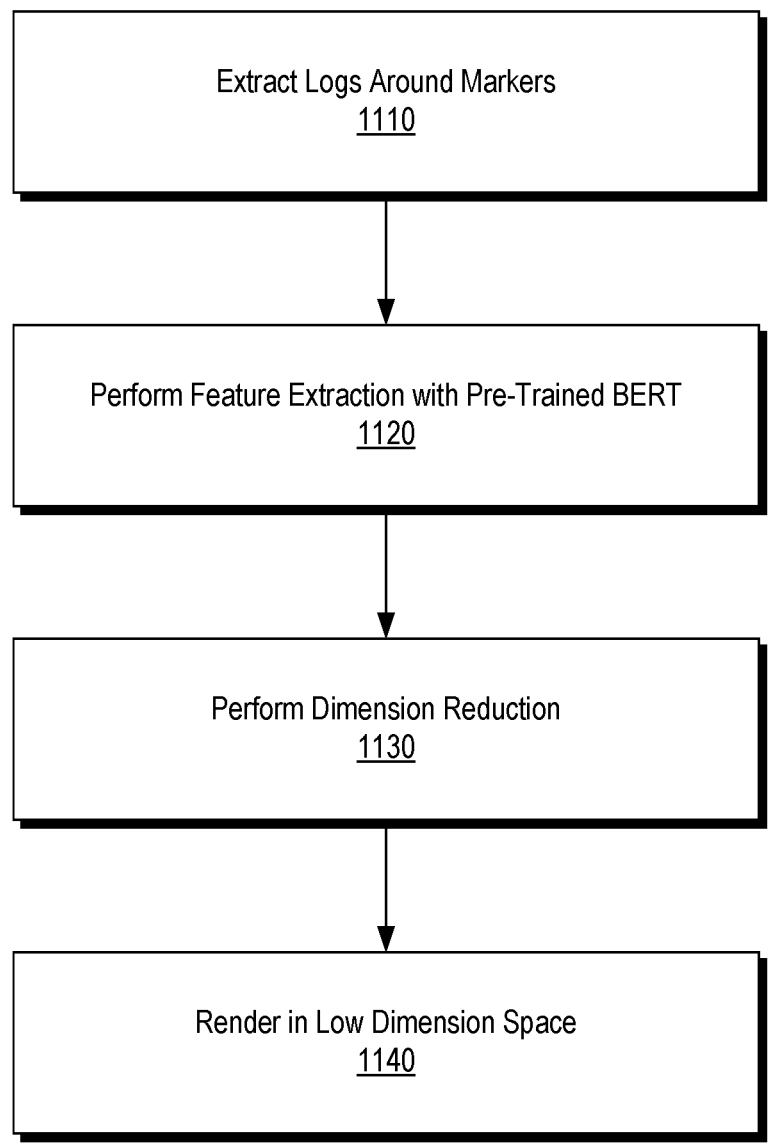
FIG. 11 illustrates an example of a method.

FIG. 11 shows an example of a method 1100 that can be utilized in a marker quality control workflow, optionally in a semi-automatic or an automatic manner. As shown, the method 1100 includes an extraction block 1110 for extracting logs around markers (e.g., window of log data, etc.), a performance block 1120 for performing feature extraction using a pre-trained BERT model, a performance block 1130 for performing a dimension reduction, and a render block 1140 for rendering a visualization to a display of information in a low dimension space.

As an example, the method 1100 can be part of a semi-automatic workflow for markerQC. Per the block 1110, log windows around the markers can be extracted. In such an example, a user may specify a context window size appropriate for a marker. For each marker window, the method 1100 can then, per the block 1120, extract vector encodings from a BERT model pre-trained within a Siamese setting (see, e.g., the method 700 of FIG. 7). Per the block 1130, the BERT model encodings can then be projected onto a lower dimension space, for example, using one or more dimensionality reduction techniques. Per the block 1140, a user may assess information as may be projected into a space of one, two, three, etc., dimensions.

Figure 12:
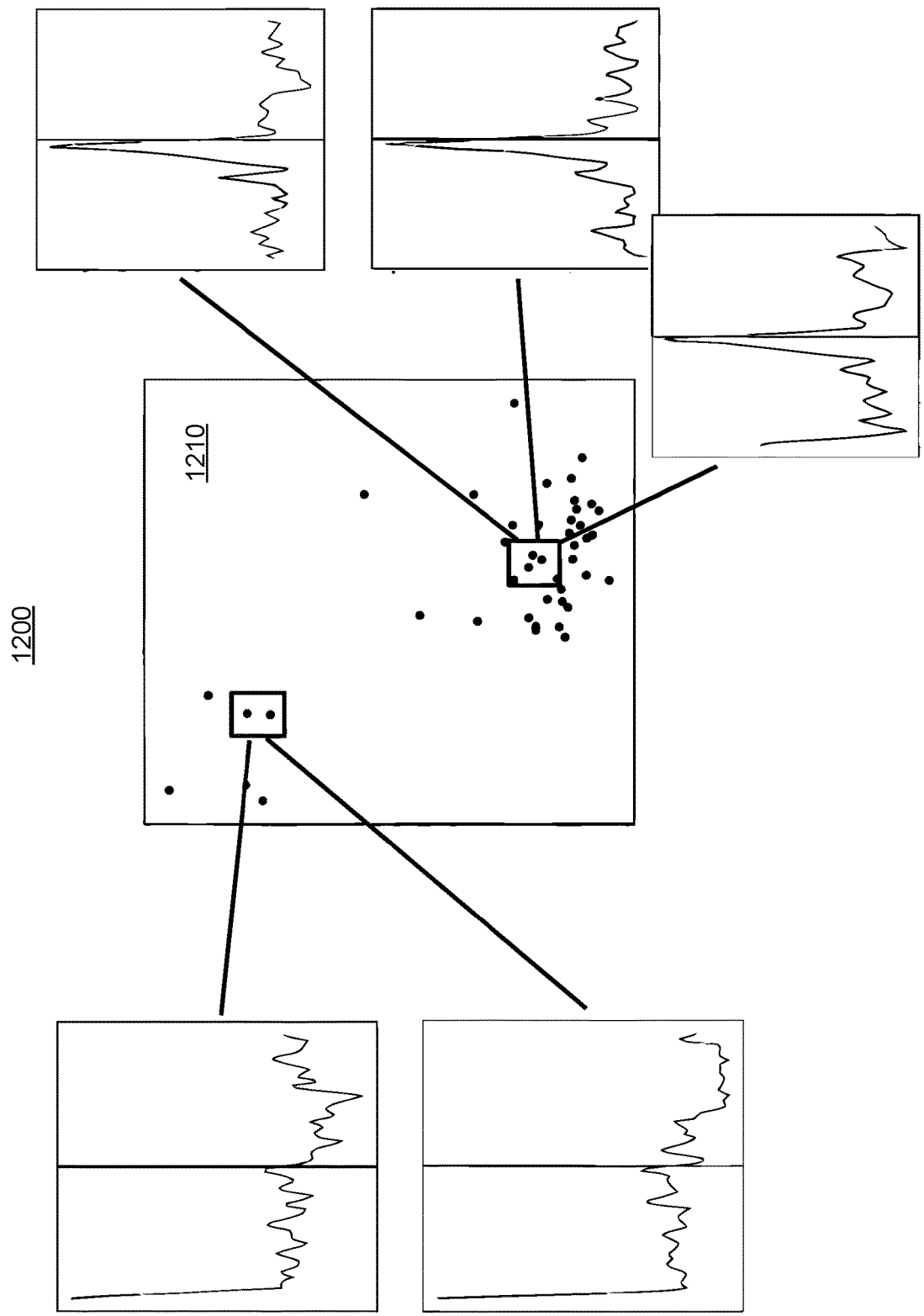
FIG. 12 illustrates an example of a dimensional space and examples of well log windows.

FIG. 12 shows various example plots 1200 where a low dimension space 1210 includes various wells, which may be color coded or otherwise coded, for example, as to similarity, dissimilarity, etc. In the example of FIG. 12, the wells are from the Permian Basin.

In the low dimension space 1210, the markers with similar log signatures are mapped close while the markers with varied log signatures are mapped far from each other. This is because, through the Siamese model, the BERT model has learned the vector encoding such that, the vectors of the similar log windows are mapped closer while the vectors of dissimilar log windows are mapped far. Such feedback can be utilized to assist one or more interpreters to quickly identify and adjust noisy (outlier) markers. Such a procedure may be performed on the machine learning model markers, for example, to provide an automated well correlation. As explained, a Siamese-BERT approach may be implemented for pre-processing and/or for post processing in one or more well correlation workflows.

As to a reference marker comparison approach, consider a markerQC procedure that can be performed where an interpreter can provide a marker signature as a reference and where remaining marker signatures can be compared to the reference using a SNN probability scores. Using such an approach, an inlier score can be assigned to each marker.

Figure 13:
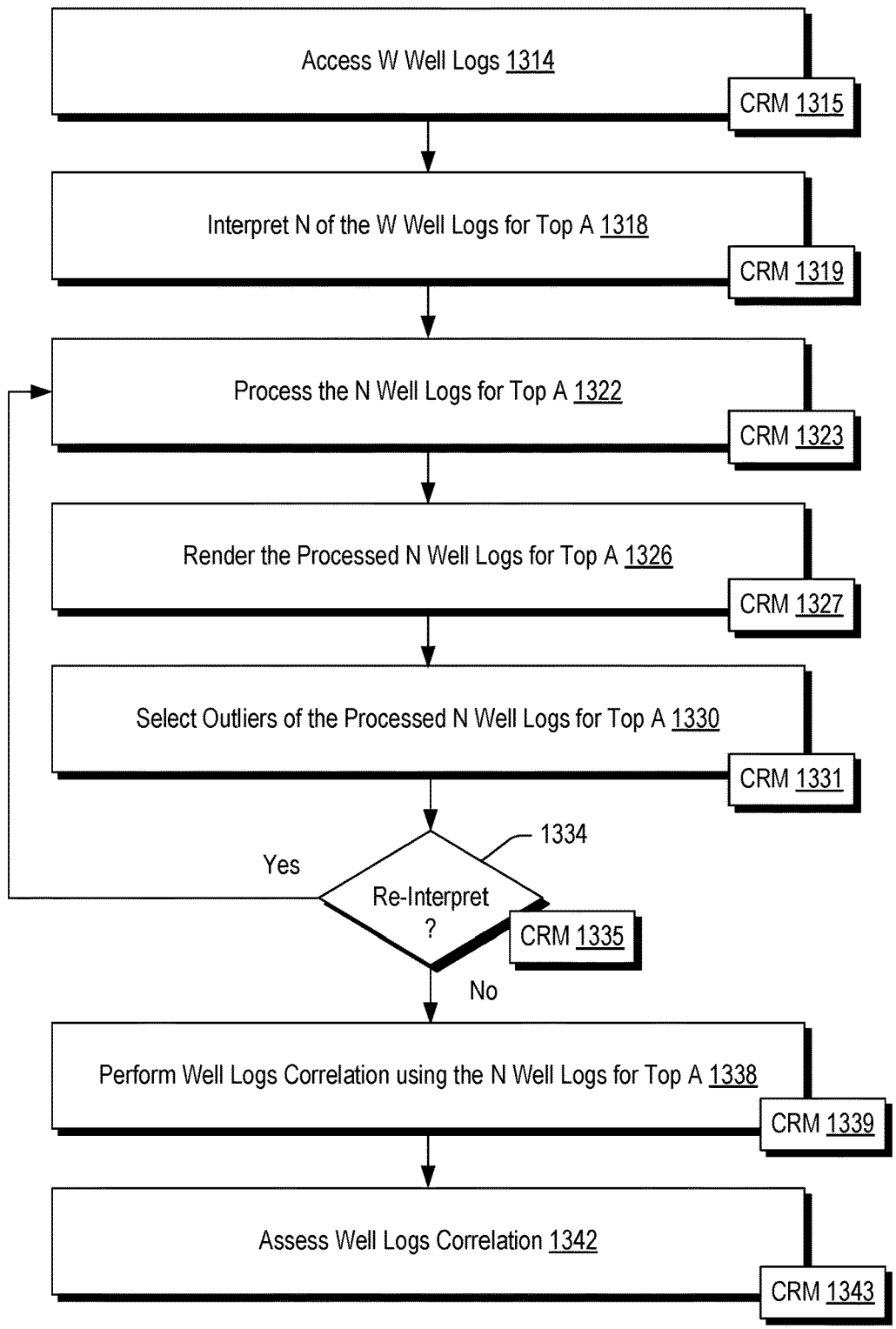
FIG. 13 illustrates an example of a method.

FIG. 13 shows an example of a method 1310 that includes an access block 1314 for accessing W well logs, an interpretation block 1318 for interpreting N of the W well logs for top A, a process block 1322 for processing the N well logs for top A, a render block 1326 for rendering the processed N well logs for top A in a reduced dimension space, a selection block 1330 for selecting one or more outliers of the processed N well logs for top A, a decision block 1334 for deciding whether to re-interpret one or more of the N well logs (e.g., and/or one or more other well logs), a "yes" branch of the decision block 1334 that continues to the process block 1322 after re-interpretation, a "no" branch of the decision block 1334 that continues to a performance block 1338 for performing a well logs correlation using the N well logs for top A, and an assessment block 1342 for assessing the well logs correlation. In such an example, the assessment block 1342 may utilize one or more features of the process block 1322. For example, consider using a machine learning model or models for assessing the well logs correlation, which may provide for rendering a result thereof in a low dimension space where quality may be determined as to the well logs correlation.

In the example of FIG. 13, various computer-readable media blocks 1315, 1319, 1323, 1327, 1331, 1335, 1339 and 1343 (CRM blocks) are shown, which can include computer-executable instructions stored in memory where the memory is non-transitory, not a signal and not a carrier wave. As an example, one or more of the CRM blocks 1315, 1319, 1323, 1327, 1331, 1335, 1339 and 1343 may be utilized by a computing system, a computational framework, etc., to perform one or more actions of the method 1310 and/or one or more other methods, workflows, etc.

Figure 14:
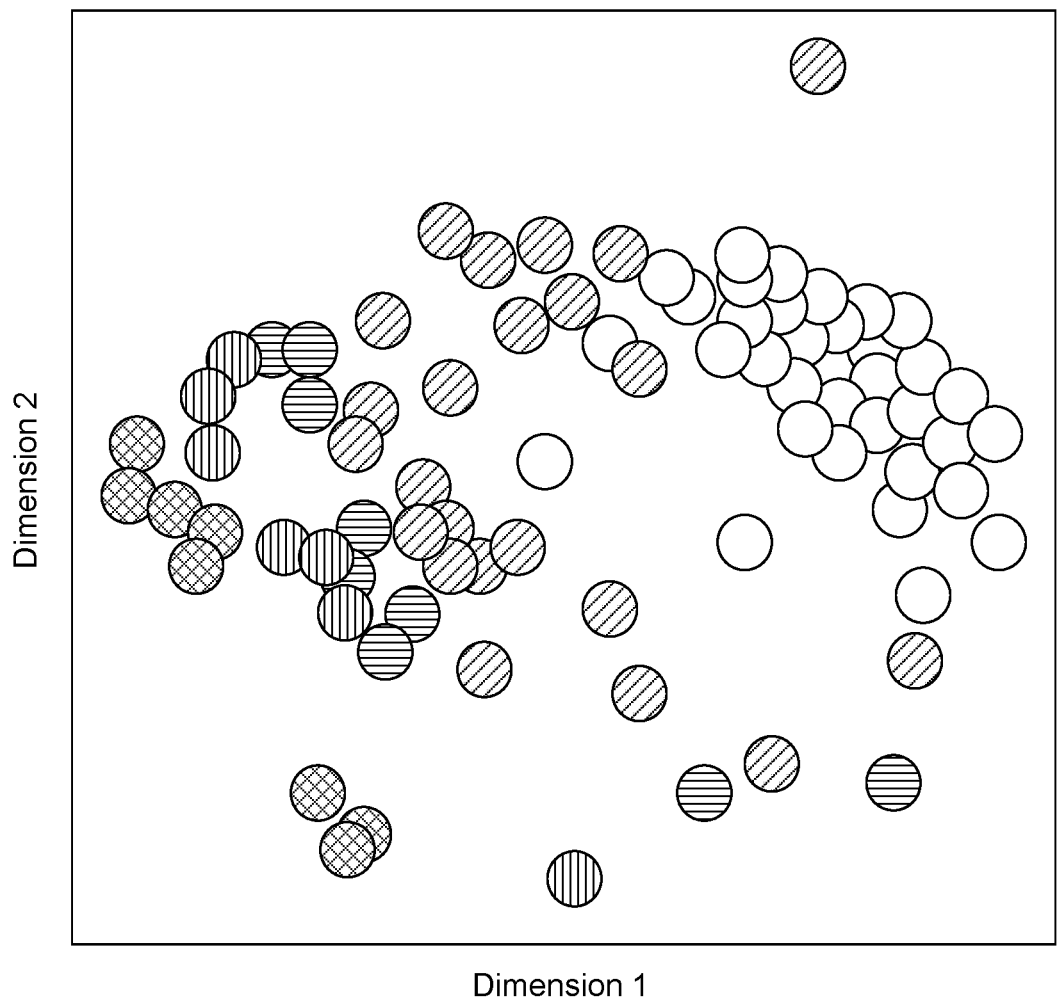
FIG. 14 illustrates an example of a dimensional space that includes coding.

FIG. 14 shows an example of a reduced dimension space 1400 where each circle represents a well with a well log that has been interpreted manually, semi-automatically and/or automatically to provide a marker such as a marker for a top (e.g., top of a layer, an interface between two layers, etc.). In the example of FIG. 14, the reduced dimension space 1400 provides an indication as to grouping or similarity between the wells as interpreted for the top. Additionally, a dimension may be added such as through shading, hatching, color coding, etc., to indicate a numeric value of each of the wells. As shown, a group of wells in the mid-to upper right of the two dimension space 1400 are highly correlated according to a correlation metric; whereas, in the mid-left of the two dimension space 1400, various wells are less correlated. In such an example, where a workflow involves interpretation that may be prone to uncertainties (e.g., bias, noise, etc.), one or more of the low correlation value metric wells may be subjected to re-interpretation and/or, for example, deemed outliers that are not to be included in a subsequent workflow (e.g., consider a well correlation workflow that utilizes inliers for training a machine learning model, etc.).

As an example, a method can include accessing well logs for wells W in a field where such well logs can include, for example, gamma ray (GR) logs, resistivity (RES) logs, density (DEN) logs, etc. As an example, an interpreter (e.g., human, machine, human-machine, etc.) may commence with GR logs and work with one well log at a time; though, an approach may include interpreting two or more logs (e.g., GR, RES, DEN, etc.) for a well. As an example, a method can include selecting a particular type of log to process first and then selecting one or more other types of logs. For example, consider selecting GR as a type followed by selection of DEN and/or RES, which, where both are selected, they may be processed simultaneously or successively. As an example, a machine learning model approach may be trained using multiple different well logs such that markers can be generated based on one or more well logs. As an example, multiple machine learning models may be utilized where each model is trained to mark a certain type of well log, for example, for one top or for multiple tops.

As an example, a method can include accessing well logs for W wells in a field where an interpreter takes N number of wells from W and picks depth values for each well in N representing a marker top A where N may be a pre-determined number suitable for training a machine learning model. In such an example, the method can include rendering a plot to a display for the N wells where the plot can be a marker QC plot. For example, consider a plot where the location of each well is in 2 dimensions of a multidimensional scaling (MDS) output. For example, a latent space of a machine learning model may be of a relatively high dimension (e.g., consider 10 dimensions, 50 dimensions, 100 dimensions or more, etc.) where an MDS approach can reduce the latent space to a lower dimension space such as a 2D space. In such an example, consider a 128 dimension latent space where each well has a value for each of the 128 dimensions. In such an example, a metric, Mu, may be computed that characterizes similarity between the 128 dimensions of each well. The metric, Mu, may be a scaler that can be plotted via an additional display attribute in a 2D space, which may be a color coded display scheme (e.g., along a red-yellow-blue spectrum). For example, consider color, on the spectrum of red-yellow-blue, as being based on the mean cross correlation of one well to the rest of the wells. In such an example, if the well is red its mean correlation with the rest of the wells is the lowest; whereas, if the well is blue, then its mean correlation with the rest of the wells is the highest. In such an example, a method can include removing wells that are the least correlated, namely the yellowish-to-red range, where they may be deemed outliers. The remaining wells (e.g., inliers) may, for example, be utilized for training for a well log correlation workflow.

As an example, for those wells that are outliers, a method can include visualizing and, for example, discussing with an interpreter to determine if there may be meaning to the outlying nature of these wells or whether picks are inaccurate compared to the other wells. Where picks may be deemed inaccurate, a method can include adjusting the picks.

As an example, where outliers may be under-represented examples, a method may include adding more examples (e.g., of a similar character, etc.) or removing them if there are not remaining examples to choose from as, for example, a machine learning model may be better trained without them.

In an ideal scenario, a workflow may lead to a marker QC plot that includes a single cluster, where wells for a marker are closely correlated with each other and there are no more outliers in the plot.

As an example, an interpreter may consider N number of wells from W wells and pick depth values for each well in N representing a marker top A. In such an example, the N wells are training wells (e.g., training data). In such an example, a plot such as the reduced dimension space 1400 may be generated and referred to as a marker QC plot. As explained, the interpreter may identify one or more inliers and/or one or more outliers for further workflow performance. As an example, an inlier and/or outlier determination may occur in a higher dimension space where, for example, a line, a plane, a curve, a surface, etc., may be automatically determined that provides for demarcation of inliers and outliers.

As an example, a method may utilize a window size for series data of approximately 400 data points. In such an example, a Siamese Neural Network (SNN) can be utilized where input can include well log data windows for a number of wells where the well log data windows can include a marker for a top. As an example, an output of the SNN may be in a latent space with 128 dimensions. As explained, one or more approach may be utilized to assess a dimension or dimensions in the latent space. A full dimensional approach may utilize the 128 dimensions; noting that the 128 dimensions may be subjected to multidimensional scaling (MDS) to reduce dimensionality, for example, to a number of dimensions that may explain or otherwise represent similarity or dissimilarity between wells. As to the aforementioned MDS approach using the metric, Mu, a threshold may be utilized as a cutoff that determines outliers and/or inliers. Where dimensionality is higher, a line, a plane, a curve, a surface, etc., may determine outliers and/or inliers.

As explained, in an ideal scenario, a low dimension space may include a single cluster for a number of wells where those wells may be utilized in one or more workflows. As an example, a single cluster of wells may be considered the "ground truth" for purposes of training, which may involve splitting data in to training and testing data. As an example, a group of marked well logs may be utilized in a well log correlation workflow that can, for example, provide output as shown in the GUI 200 of FIG. 2. Such a group may be generated via inlier/outlier determination, adjustment of one or more markers (e.g., in a feedback loop, etc.), etc. As an example, a method may aim to provide a group with sufficient diversity such that it can more readily handle unknown input to make top predictions or otherwise advance a well log correlation workflow.

As an example, a method can include assessing coherence in predictions. For example, consider utilizing a ground truth group of well logs for a number of wells as a basis for identifying markers in unmarked well logs for a larger number of wells. In such an example, a Siamese-BERT approach with dimensional reduction (e.g., MDS, etc.) may be applied to the larger number of wells to determine whether the ground truth group was sufficient to identify the markers in the well logs of the larger number of wells. In such an example, some of the well log markers may be considered as being insufficiently identified such that the ground truth group can be revised or such that another ground truth group can be generated.

As an example, a method can include determining whether a well log signature around a marker is coherent and/or predicting one or more other signatures. As an example, a method may be implemented in parallel, for example, for different types of well logs, for different tops, etc. As an example, results from one or more runs (e.g., whether in parallel and/or in series) can be compared, which may provide feedback as to adjustments, re-training, etc.

As mentioned, a window may be applied to series data where a window size may be selected, adjusted, etc. As an example, a window may be extended such that it is as long as a well log. Where an entire span of a well log is utilized, a method may provide for analysis of well logs as signatures; rather than a smaller well log window that is associated with a particular marker. In such an example, similarity of entire well logs may be assessed.

As an example, a window size may be determined based on available data. For example, in the GUI 200 of FIG. 2, some of the well logs for the seven wells are less than the span of some of the other well logs (see, e.g., the span as to depth for the third and seventh well logs). Also, some wells may include more different types of well logs than other wells (see, e.g., the GUI 200 of FIG. 2). As an example, a computational framework may automatically assess well logs to determine which may be included in a workflow and, for example, what types of well logs and/or well log window size(s) may be utilized.

As explained, a method can provide for vector representation of a well log sequence using a BERT technique. In such an example, the method can include providing visual feedback to an interpreter where a low dimensional visualization of marker signature similarity can be generated (see, e.g., the plot 1400 of FIG. 14). As explained, a BERT model can provide vector representations for log sequences, which can be used along with appropriate dimension reduction techniques for marker similarity visualization. In various examples, a method can generate a normalized probability score of well log window similarity through uses of an SNN, which can used for a reference marker comparison approach.

As an example, a method can include a self-supervised learning objective. For example, for reliable training of an SNN model, a relatively large set of labeled log-pair samples may be required. In such an example, a self-supervised learning strategy can be implemented where labels for the log pairs are generated from unlabeled well log data. Such an approach can enable training of a Si-BERT model without a demand for manual labelling. For example, a self-supervised learning approach can generate a ground truth group that can be of a number or members sufficient for performing one or more well log correlation tasks.

As an example, a workflow may also include one or more other techniques. For example, consider Dynamic Time Warping (DTW), which provides an un-normalized similarity score and does not directly provide vector representations for sequences. As another example, consider one or more Recurrent Neural Networks (RNNs), which may implement Long Short Term Memory (LSTM) (e.g., to address the issue of vanishing gradients in RNNs). However, LSTMs may fail to remember patterns over longer ranges.

As explained, a method can implement a BERT model that can provide a vector representation for a well log sequence and that can also provide a normalized probability score of well log window similarity through implementation of an SNN. As explained, the use of a self-attention component enables the BERT to model long term dependencies in well log sequences. As each time increment and/or depth increment in a well log sequence can be used for computation of self-similarity, it enables a BERT model to retain relevant information even in longer sequences.

As to types of machine learning models, consider one or more of a support vector machine (SVM) model, a k-nearest neighbors (KNN) model, an ensemble classifier model, a neural network (NN) model, a Bidirectional Encoder Representation from Transformers (BERT) model, a Siamese neural network (SNN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model, which may be a machine learning model, may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks (SNNs), for example, using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group, Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a framework, library, etc., can include one or more components for multi-dimensional scaling (MDS). For example, consider the SCIKIT platform. MDS may also be referred to as Principal Coordinates Analysis (PCoA), Torgerson Scaling or Torgerson-Gower scaling. As an example, MDS can take an input matrix giving dissimilarities between pairs of items and output a coordinate matrix whose configuration minimizes a loss function. As an example, MDS can be implemented to generate a low-dimensional representation of data, for example, in which distances respect distances in an original high-dimensional space. MDS may be applied to assess similarity or dissimilarity of data. For example, MDS can attempt to model similarity or dissimilarity data as distances in a geometric space. Two types of MDS approaches include metric and non-metric, which are available in the SCIKIT platform. In metric MDS, an input similarity matrix arises from a metric (and thus respects the triangular inequality) where the distances between output of two points are then set to be as close as possible to the similarity or dissimilarity data. In the non-metric version, MDS will try to preserve the order of the distances, and hence seek a monotonic relationship between the distances in the embedded space and the similarities/dissimilarities.

As explained, MDS can provide for visualization of how near points are to each other for various metrics (e.g., distance, dissimilarity metrics, etc.) and can produce a representation of data in a smaller number of dimensions. As an example, MDS can operate on a matrix of pairwise distances or dissimilarities (or similarities).

As an example, a method may implement one or more machine learning models that can receive input and generate output where the output can be in a dimensional space, which may be a feature space (e.g., consider a number of features where each feature corresponds to a dimension). In such an example, the method may include implementing an MDS technique and/or another technique to reduce dimensionality, for example, for purposes of machine and/or human analysis, etc.

As an example, a database can include information such as elevations, formation codes, formation tops, method obtained, and reference point codes. Such information can be provided along with a location identifier, which may be a name, latitude and longitude, an American Petroleum Institute (API) number, etc. As an example, as to elevations, consider a parameter "Elev_KB", which is a drilling rig's kelly bushing elevation, or a parameter "Elev_DF, which is a drilling floor elevation (e.g., of a drilling rig or a derrick). As to formation codes, consider, for example, American Association of Petroleum Geologists codes (AAPG_Cd) or one or more other types of codes. As to method obtained, such information can include logging related information (e.g., logging tool, etc.).

Figure 15:
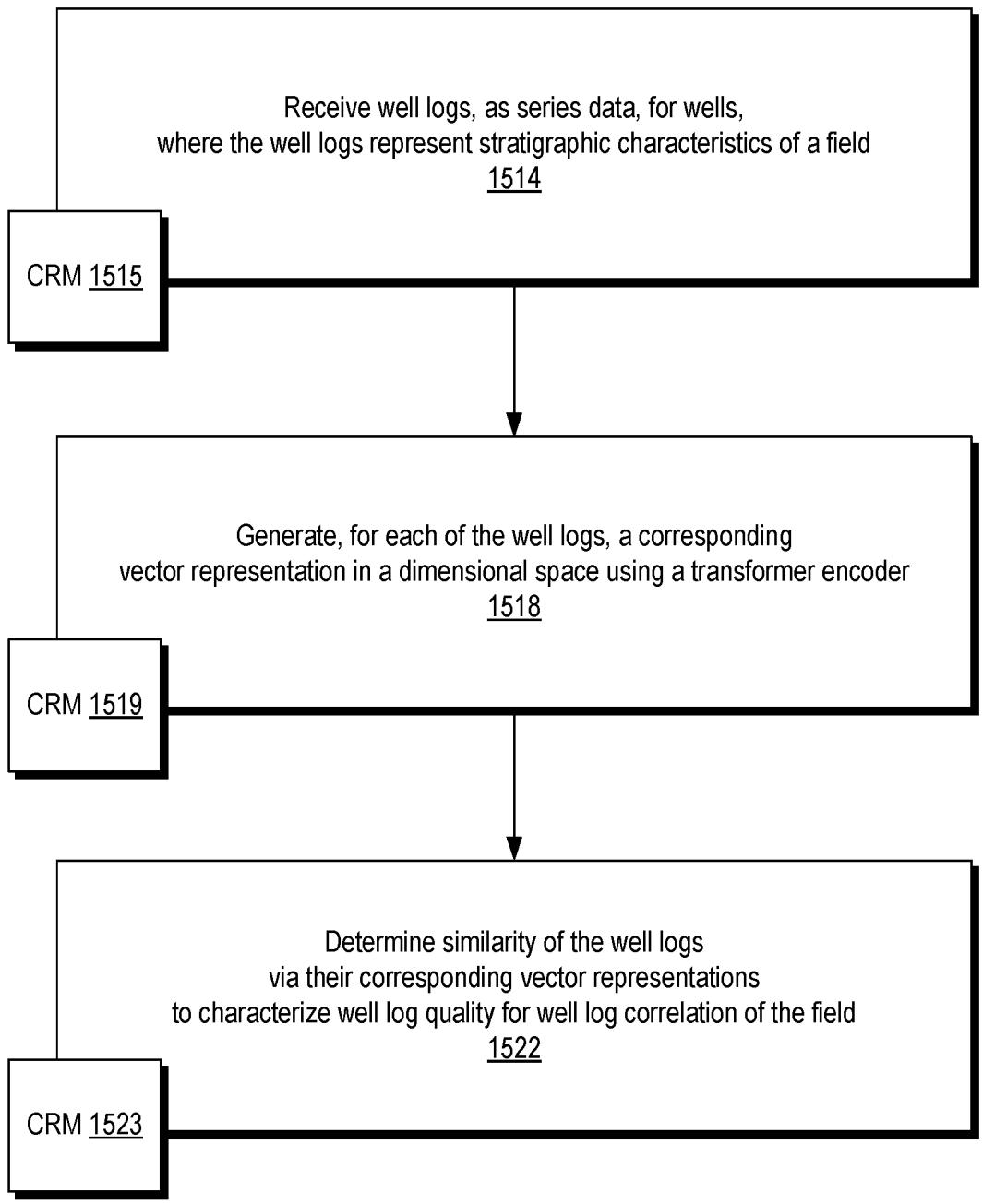
FIG. 15 illustrates an example of a method.

FIG. 15 shows an example of a method 1510 that includes a reception block 1514 for receiving well logs, as series data, for wells, where the well logs represent stratigraphic characteristics of a field; a generation block 1518 for, for each of the well logs, generating a corresponding vector representation in a dimensional space using a transformer encoder; and a determination block 1522 for determining similarity of the well logs via their corresponding vector representations to characterize well log quality for well log correlation of the field.

The method 1510 is shown in FIG. 15 in association with various computer-readable media (CRM) blocks 1515, 1519, and 1523. Such blocks generally include instructions suitable for execution by one or more processors (or cores) to instruct a computing device or system to perform one or more actions. While various blocks are shown, a single medium may be configured with instructions to allow for, at least in part, performance of various actions of the method 1510. As an example, a CRM block can be a computer-readable storage medium that is non-transitory, not a carrier wave and not a signal. As an example, such blocks can include instructions that can be stored in memory and can be executable by one or more of processors. As an example, blocks may be provided as one or more sets of instructions, for example, such as the one or more sets of instructions 466 of the system 460 of FIG. 4.

As an example, a method can include receiving well logs, as series data, for wells, where the well logs represent stratigraphic characteristics of a field; for each of the well logs, generating a corresponding vector representation in a dimensional space using a transformer encoder; and determining similarity of the well logs via their corresponding vector representations to characterize well log quality for well log correlation of the field. In such an example, the transformer encoder can be or include a bi-directional transformer encoder.

As an example, a method can include determining similarity of well logs at least in part by implementing a Siamese neural network.

As an example, a method can include determining similarity of well logs at least in part by implementing multi-dimensional scaling to generate output in a reduced dimensional space. For example, consider a method that includes rendering a visualization to a display of such output in the reduced dimensional space. In such an example, the visualization can include a similarity metric as an additional display attribute (or feature) where, for example, the similarity metric is color coded. As an example, a similarity metric may be rendered in a manner that can provide for ease of human vision to discern whether a similarity metric may be high, low, grouped, etc. (see, e.g., the GUI 1400 of FIG. 14).

As an example, a method can include, based on similarity of well logs, selecting a number of wells as inliers or outliers. For example, consider a method that handles a number of wells that include outliers and adjusting a well log stratigraphic marker for at least one of the number of the wells and/or that handles a number of wells that include inliers and accessing additional well logs for additional wells and performing well log correlation for the additional wells using stratigraphic markers of the inliers.

As an example, a method can handle well logs where each of the well logs includes a corresponding stratigraphic marker for a common stratigraphic feature. For example, consider stratigraphic markers that can be or include human identified stratigraphic markers and/or stratigraphic markers that can be or include machine identified stratigraphic markers. As an example, a method may include determining similarity of well logs via their corresponding vector representations to characterize well log quality based on the machine identified stratigraphic markers.

As an example, a method can include determining a window size that encompasses a stratigraphic marker. For example, consider a utilizing a window size that is defined with respect to time or with respect to depth.

As an example, a method can include determining similarity in a manner that generates a normalized probability score of well log marker window similarity through implementation of a Siamese neural network.

As an example, a method can include training a transformer encoder via self-supervised learning. Such a method may operate, for example, as a data-driven approach to training and generation of a trained transformer encoder. As an example, a method can include training that may be responsive to one or more triggers, for example, as more data are accessed, acquired, etc.

As an example, a system can include a processor; memory operatively coupled to the processor; and processor-executable instructions stored in the memory to instruct the system to: receive well logs, as series data, for wells, where the well logs represent stratigraphic characteristics of a field; for each of the well logs, generate a corresponding vector representation in a dimensional space using a transformer encoder; and determine similarity of the well logs via their corresponding vector representations to characterize well log quality for well log correlation of the field.

As an example, one or more computer-readable storage media can include computer-executable instructions executable to instruct a computing system to: receive well logs, as series data, for wells, where the well logs represent stratigraphic characteristics of a field; for each of the well logs, generate a corresponding vector representation in a dimensional space using a transformer encoder; and determine similarity of the well logs via their corresponding vector representations to characterize well log quality for well log correlation of the field.

As an example, a computer program product can include computer-executable instructions to instruct a computing system to perform a method or methods such as, for example, one or more of the methods described herein.

As an example, a workflow may be associated with various computer-readable medium (CRM) blocks. Such blocks generally include instructions suitable for execution by one or more processors (or cores) to instruct a computing device or system to perform one or more actions. As an example, a single medium may be configured with instructions to allow for, at least in part, performance of various actions of a workflow. As an example, a computer-readable medium (CRM) may be a computer-readable storage medium that is non-transitory, not a carrier wave and not a signal. As an example, blocks may be provided as one or more sets of instructions, for example, such as the one or more sets of instructions 466 of the system 460 of FIG. 4. For example, a system such as the system 100, the system 460, the computing system 1600, etc., may be utilized to implement a method such as the method 1510 of FIG. 15.

Figure 16:
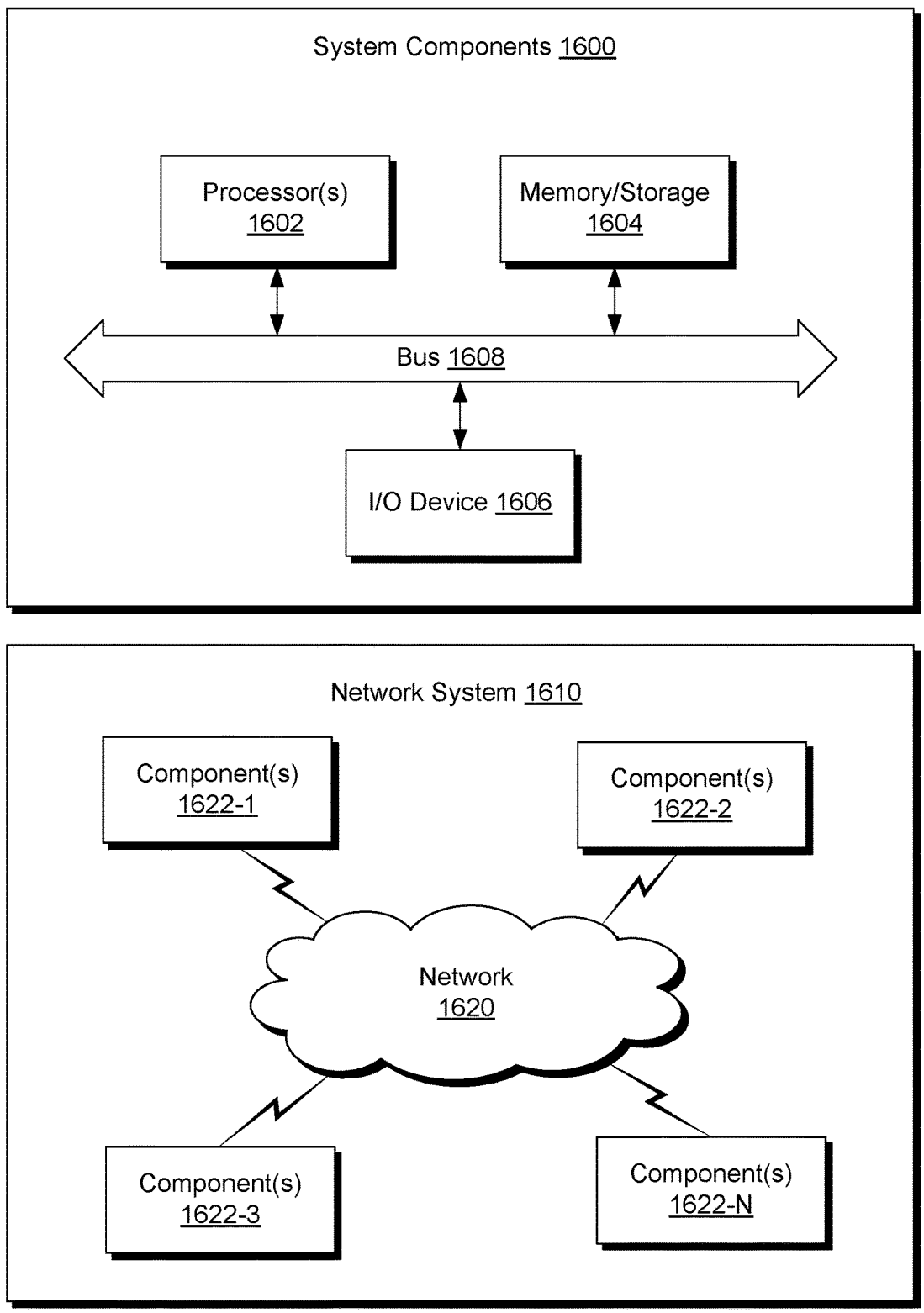
FIG. 16 illustrates example components of a system and a networked system.

FIG. 16 shows components of an example of a computing system 1600 and an example of a networked system 1610 with one or more networks 1620. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1602-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method comprising:
   drilling, using one or more drilling tools, a plurality of wells in a field;
   generating, via one or more downhole sensors, a series of measurements indicative of stratigraphic characteristics of the field while drilling the plurality of wells;
   receiving, as well logs, the series of measurements indicative of the stratigraphic characteristics of the field;
   for each of the well logs, generating a corresponding vector representation in a dimensional space using a transformer encoder;
   determining similarity of the well logs via their corresponding vector representations to characterize well log quality for well log correlation of the field, comprising implementing multi-dimensional scaling for the vector representations in the dimensional space to generate output in a reduced dimensional space;
   rendering a visualization to a display of the output in the reduced dimensional space, the visualization comprises a similarity metric as an additional display attribute;
   determining, based on the similarity of the well logs, that a first well included in the plurality of wells is an outlier and a second well included in the plurality of wells is an inlier; and
   adjusting a first stratigraphic marker included in a first well log corresponding to the first well based on a second stratigraphic marker included in a second well log corresponding to the second well.

2. The method of claim 1, wherein the transformer encoder comprises a bi-directional transformer encoder.

3. The method of claim 1, wherein determining similarity of the well logs comprises implementing a Siamese neural network.

4. The method of claim 1, wherein the similarity metric is color coded.

5. The method of claim 1, wherein each of the well logs comprises a corresponding common stratigraphic marker for a common stratigraphic feature.

6. The method of claim 5, wherein the common stratigraphic marker is a human identified stratigraphic marker.

7. The method of claim 5, wherein the common stratigraphic marker is a machine identified stratigraphic marker.

8. The method of claim 7, wherein determining similarity of the well logs via their corresponding vector representations to characterize well log quality is based on the common stratigraphic marker.

9. The method of claim 5, further comprising determining a window size that encompasses the common stratigraphic marker.

10. The method of claim 9, wherein the window size is defined with respect to time or with respect to depth.

11. The method of claim 1, wherein determining similarity generates a normalized probability score of well log marker window similarity through implementation of a Siamese neural network.

12. The method of claim 1, further comprising training the transformer encoder via self-supervised learning.

* * * * *